(12) United States Patent
Nabkel et al.

(10) Patent No.: US 7,298,734 B2
(45) Date of Patent: Nov. 20, 2007

(54) METHOD AND SYSTEM COMMUNICATION SYSTEM MESSAGE PROCESSING BASED ON CLASSIFICATION CRITERIA

(75) Inventors: Jafar S. Nabkel, Boulder, CO (US); Paul D. Jaramillo, Westminster, CO (US); Ronald J. Egan, Aurora, CO (US)

(73) Assignee: Qwest Communications International, Inc., Denver, CO (US)

( * ) Notice: Subject to any disclaimer, the term of this patent is extended or adjusted under 35 U.S.C. 154(b) by 995 days.

(21) Appl. No.: 09/843,082

(22) Filed: Apr. 25, 2001

(65) Prior Publication Data

US 2003/0031164 A1 Feb. 13, 2003

Related U.S. Application Data

(60) Provisional application No. 60/273,430, filed on Mar. 5, 2001.

(51) Int. Cl.
*H04L 12/66* (2006.01)

(52) U.S. Cl. .............. 370/353; 370/401; 379/142.01; 379/243; 379/265.02

(58) Field of Classification Search ............. 370/230, 370/352, 353, 401, 356, 395.5, 395.6, 252; 709/218, 249, 250; 719/311, 318
See application file for complete search history.

(56) References Cited

U.S. PATENT DOCUMENTS

| | | | |
|---|---|---|---|
| 6,208,720 B1 * | 3/2001 | Curtis et al. ............ 379/114.14 |
| 6,301,229 B1 * | 10/2001 | Araujo et al. ............... 370/252 |
| 6,314,176 B1 * | 11/2001 | Gunasekar ............. 379/265.01 |
| 6,377,568 B1 * | 4/2002 | Kelly ........................ 370/352 |
| 6,426,950 B1 * | 7/2002 | Mistry ....................... 370/352 |
| 6,438,594 B1 * | 8/2002 | Bowman-Amuah ......... 709/225 |
| 6,442,528 B1 * | 8/2002 | Notani et al. ................. 705/9 |
| 6,549,956 B1 * | 4/2003 | Bass et al. .................. 719/328 |
| 6,633,899 B1 * | 10/2003 | Coward ..................... 709/202 |
| 6,671,724 B1 * | 12/2003 | Pandya et al. ............. 709/226 |
| 6,744,877 B1 * | 6/2004 | Edwards ................ 379/265.02 |
| 6,915,345 B1 * | 7/2005 | Tummala et al. .......... 709/225 |
| 6,944,166 B1 * | 9/2005 | Perinpanathan et al. .... 370/401 |
| 7,145,898 B1 * | 12/2006 | Elliott ....................... 370/352 |
| 2001/0003203 A1 * | 6/2001 | Mache ....................... 713/201 |
| 2002/0010776 A1 * | 1/2002 | Lerner ....................... 709/225 |
| 2003/0004774 A1 * | 1/2003 | Greene et al. ................. 705/8 |
| 2003/0026410 A1 * | 2/2003 | Lumsden ............... 379/221.01 |

* cited by examiner

*Primary Examiner*—Hassan Kizou
*Assistant Examiner*—Brian T O'Connor
(74) *Attorney, Agent, or Firm*—Robert G. Crouch; Gregory T. Fettig; Marsh, Fischmann & Breyfogle LLP

(57) ABSTRACT

A system and method that provides for an exchange of messages and associated data across a plurality of communication network system entities for one or more communications networks, wherein the system includes one or more distributed message brokers which are in communication with any number of communication network system entities. The message broker may perform message processing, which includes relaying and screening based on prioritization rules which may include customer classification criteria, associated service classification, and system entity classification applied to a message classification for messages communicated over the communications networks.

35 Claims, 11 Drawing Sheets

Figure 5: MMSP – Example Merged Multi-Service Service Profile:

| | MASTER Key Fields | | | | | | Presence Service 214 | | Availability Service | Selective Call Forwarding Service 218 | | Priority Call Waiting Service 220 | | | Do Not Disturb Service 222 | | Instant Messaging Service | No Solicitation Service 224 | Other Service XYZ 226 | | |
|---|---|---|---|---|---|---|---|---|---|---|---|---|---|---|---|---|---|---|---|---|---|
| | | Device User Name | Device System ID | ??? | 208 E-Mail Address | 210 Internet (IP) Address | 212 Business Phone Number | Device State | Device Location | Visibility of Who Can See Me | Service Parameter 1 | Service Parameter 2 | Service Parameter 1 | Service Parameter 2 | | Service Parameter 1 | | Service Parameter 1 | Service Parameter 1 | Service Parameter 1 | Other Parameters |
| Visibility to Other Services | | | | | | | | Visible | | | | | | | | | | | | | |
| Global Service ID | | | LREFXB3975ZT | | | | | | | | | | | | | | | | | | |
| | | Kitchen Phone | XK87RW92K1 | | | | | ON | Home | | | | | | | | | | | | |
| | | Bedroom Phone | XK87RT35B2 | | | | | OFF | Home | | | | | | | | | | | | |
| | | Den Phone | XK87RP80D1 | | | | | ON | Home | | | | | | | | | | | | |
| | | Mobile Phone 1 | XK87RB31M1 | | | | | ON | Office | | | | | | | | | | | | |
| | | Mobile Phone 2 | XK87RC46M2 | | | | | OFF | Travel | | | | | | | | | | | | |
| | 204 Personal Phone Number (Home/Mobile) | 206 Alternate Phone Number (Mobile, Pager,...) | | | | | | | | | Forwarding Phone Number | | Interrupt Other Calls | | | Conditional Hours | | | | | |
| Individual Name | | | | | | | | | | | Activated | | Calls with Individual are Interruptible | | | Available | | Available | Activated | Activated | Activated |
| Default for ALL Individuals | | | | | | | | | | NO | OFF | — | ON | ALL | | OFF | 6:00p-8:00p + 11:00p-7:00a | NO | Y | | |
| Modifiability by Child ISC | Read-Only + ADD | Edit | | | Read-Only + ADD | Read-Only + ADD | Edit | | | | L | Lock | Edit | Lock | | Edit | Lock | Edit | Locked | | |
| Jennifer Smith | 532-690-5910 | 532-894-1230 | | | jsmith@unive rse.net | 943.32.05.032 | 532-742-823- | | | YES | | | Y | Y | | | | Y | | | |
| Konor Baguandu | 723-940-7393 | 723-672-0049 | | | Konor@qwes t.net | 732.00.32.532 | | | | | | | NO | NO | | ON | | NO | | | |
| Cheryl Vermille | 493-883-6219 | 948-405-1120 | | | Cvermi@gala ctic.com | 211.43.88.534 | 948-233-8129 | | | | ON | 303-747-8209 | Y | Y | | | | Y | | | |
| Christopher Johnson | 303-494-3290 | 303-023-1029 | | | Chris.johnson @qwest.net | 131.77.35.957 | 303-541-7070 | | | | | | Y | N | | | | Y | | | |
| Bilutu Mashita | 297-403-0492 | 297-593-9340 | | | Bilutu.mashit a@qwest.net | 683.11.55.433 | | | | YES | | | NO | Y | | ON | | | | | |
| ... | | | | | | | | | | | | | | | | | | | | | |

228 200 216 230 232

METHOD AND SYSTEM COMMUNICATION SYSTEM MESSAGE PROCESSING BASED ON CLASSIFICATION CRITERIA

RELATED APPLICATIONS

This application claims priority under 35 U.S.C. §119 to prior U.S. Provisional Patent Application Ser. No. 60/273,430 filed Mar. 5, 2001, the entirety of which is hereby incorporated by reference.

FIELD OF THE INVENTION

The invention described herein relates to an integrated control system for a plurality of communications services, and more particularly to a control system and method for intelligent, distributed, and dynamically integrated control of multiple communication services, possibly across multiple domains and possibly from a multiple communication services providers.

BACKGROUND OF THE INVENTION

In the world of telecommunications, a party has a number of choices with regards to types of communication. These different types may include such services as synchronous communications, such as voice telephony, over networks such as the Public Switched Telephone Network (PSTN) or asynchronous communications, such as Instant Messaging, over networks such as the Internet. Emerging technologies, such as Voice over Internet Protocol (VoIP) carry telephony over packet networks and present new types of communication service. A party may engage any number of communications service providers in order to employ these types of communications.

In employing the various communication services, via multiple service providers, existing communication networks, such as the PSTN and the Wireless/PCS (Personal Communication Service) Network, either provide very limited service control capabilities, or none at all. Traditional SSP (Service Switching Points) switches and AIN (Advanced Intelligent Network) SCPs (Service Control Points) do indeed have limited static service control with built-in simple management of multiple services. Typically called "feature management," (i.e., one aspect of service control) the logic that governs service prioritization, however, is statically defined and often even built into the processing system environment on the SSP or SCP. Neither support dynamic insertion (i.e., installation and activation) of new services—much less from multiple providers across multiple domains—that is, services that were conceived and built after the service control logic was deployed. As such, plug 'n' play of new services with intelligent service interworking may not be possible.

Similarly, existing data and multimedia communications systems, such as the Internet-based networks or specific consumer video delivery systems, provide a predominantly single-application-to-single-service capability. Historically this relationship was very rigid, for example, an email application provided a capability to exchange email—an email service; a file transfer application provided the capability to exchange files—a file transfer service; and a web browser provided the capability to access web-page servers.

Currently, there is a trend to bundle multiple service capabilities into single ("multiservice") applications (e.g., Microsoft Internet Explorer with Web Browser, Email and Net-News capabilities, or Netscape Navigator with similar capabilities, including Instant Messaging), however, these applications only integrate the user interface to multiple, disparate services with minor levels of integration between the individual services, e.g., a shared address book or web access direct from links contained in email messages. Also, these applications still exhibit the same restrictions as the PSTN, that is, there is limited, if any, capability to dynamically insert new services. In addition, most of the "service integration" is performed by software in the customer equipment/network, or in individual application servers, and not in the service provider network.

Finally, there is only very limited service interaction between traditional PSTN and current data/multimedia or other telecommunications environments, e.g., Wireless/PCS. Examples of these interactions would be services such as "Internet Call Waiting", "TV Caller ID", "Wireless Extension", "Click-to-Dial" web pages and emerging Internet Telephony to PSTN Gateway capabilities. Again, the ability to support dynamic insertion of new services in this combined environment is non-existent.

Similarly, existing feature management systems do not provide a method and system to integrate, or dynamically merge, profile information from multiple services, and or multiple providers. This includes everything from service configuration parameters and customer preferences to more complex lists with associated actions. For example, most people today use multiple devices (and services) that each have their own "directory" of other people (e.g. address/phone book, screening list, hot-dial list, e-mail list, . . . ) where each entry might have one or more parameters or actions associated with it. The lack of an inter-service schema and method to merge these disparate profiles causes end-users to re-enter the same data for each service. In addition, each service presents a different user interface limited to the profile information it cares about, rather than an integrated interface across services and service providers.

Today, enhanced services augment basic call control through a predefined (static) set of events and messages. The Advanced Intelligent Network (AIN) capability of the PSTN is an example of this wherein predefined triggers (events) generate predefined messages that are relayed to an adjunct processor (the SCP) to determine what action should occur. In turn, the static (compiled) feature manager in the SCP is only able to filter the predefined set of messages and based on its hard-coded logic initiate a specific service. It is not able to process events or messages defined by new services or new transport control capabilities. Therefore, service control is static, limited, and not extensible.

Further limitations of today's feature managers exist in their proprietary service creation and execution environments. It is not easy, and in some cases not possible, to deploy services created by multiple service providers in a single service creation—execution environment. In addition, it is not possible to deploy those services across different domains—for example, one within an ILEC (Incumbant Local Exchange Carrier) local network, another within a inter-exchange carrier network.

And finally, existing feature managers don't work in a distinct functional layer of service control with open interoperable interfaces between the feature manager and individual services, or between the feature manager and transport control (of transport, switching, routing, and transmission).

Beyond traditional SSPs and SCPs few other systems provide any kind of service control, including IP (Internet Protocol) application servers. Some emerging technologies may offer more in the way of static service registration and control, but these are based on predefined prioritization and processing rules. Given the static, limited, and closed capabilities of feature managers today, there exists a need to provide dynamic service integration and management.

As we look to the future, a multi-technology-infrastructure environment, consisting of legacy PSTN-AIN, Wireless/PCS Voice and Data, Voice over Asynchronous Transfer Mode (VoATM), Voice over Internet Protocol (VoIP), Gigabit Ethernet access, Consumer Video and a full set of Internet-based data and multimedia services will exist. This combined environment will be much more valuable with convergence toward an integrated multi-service environment providing dynamic service integration and management. In order to provide this guidance, an open and systematic architecture that integrates services with powerful services control functionality, capable of addressing these limitations and constraints is required.

SUMMARY OF THE INVENTION

Described herein is system and method for providing an exchange of messages and associated data across a plurality of communication network system entities for one or more communications networks. Included in the system is one or more distributed message brokers which are in communication with any number of communication network system entities so as to provide message processing. The message processing may include relaying and screening based on prioritization rules which may include customer classification criteria (relative ratings of customer attributes), associated service classification (relative ratings of service attributes), and system entity classification (relative ratings of system entity attributes) applied to a message classification of one or more messages communicated over the communications networks between the system entities.

The customer classification criteria described above may include a number of levels such as Platinum, Gold, Silver, and Bronze. The customer classification criteria may be maintained by an operations support customer care system and communicated to the at least one message broker through a command message exchange. Message classifications may include message type (request, information, instruction), associated event in message payload, and level of support of connection or connectionless oriented message transactions between system entities.

The message broker may relay messages to an appropriate destination based on a high-level name incorporated into the one or more messages. Also, the message broker may be configured to employ message delivery parameters which affect the manner of delivery for the messages of a message classification between identified origination-destination endpoints. The message delivery parameters may include timers, queuing priority order, one or more levels of message delivery guarantees, ordering of sequential messages, integrity of message delivery, and message duplication handling.

Further, the message broker may be configured to perform the message relay and screening prioritization of the messages of a message classification based on static message operation prioritization rules. The static message operation prioritization rules may include security policies, resource allocation arbitration, reactivity to communication network conditions to ensure performance levels, and relationship definitions of associated messaging endpoints. The message broker may also perform dynamic prioritization for message relay and screening of the messages of a message classification through communication with the system entities from which messages are generated or received.

Other operations for which the message broker may be configured include discovery which allows a serving system entity to advertise capabilities and a client system entity to one or more methods associated with the serving system entity. Also performed may be transparency, which enables both the serving and client system entities to communicate without requiring knowledge of an addressable reference for every one of the system entities in the plurality of communications networks.

The communications networks described herein may include a number of different operation layers and domains within which the message brokers may operate. For example, the communications network may include a service layer, a service control layer, and a transport control layer. System entities operating within the layers may include, but are not limited to, other message brokers, a Service Director (logic) entity, an Integrated Service Controller (ISC), a Transport Association Controller (TAC), Association State Manager(ASM), and service management entities (fault, configuration, accounting, performance, and security systems). The layers described above may exist in any number of communications domains.

According to the system described herein, the message broker may be configured to operate in the services layer so as to relay or screen messages with system entity resident in a service layer and at least one system entities resident in the service control layer. The message broker may communicate with a Service Director (logic) entity, one or more message brokers each within the service layer, and one or more message brokers each within the service control layer.

The message broker may be further configured to operate in a services control layer within the communications networks and relay or screen messages through the services control layer between system entities located in the service layer and the system entities located in at least one transport control layer. The message broker may be further configured to exchange messages with an Integrated Service Controller in the service control layer.

Still further, the message broker may be configured to operate in a transport control layer within the communications networks so as to relay or screen the messages through the transport control layer between the system entities located in the service control layer and the system entities located in a transport layer. The message broker may further exchange messages with the Transport Association Controllers in the transport control layer.

The message brokers which are configured to operate in any of the layers described above, may also provide for inter-message distributions across a plurality of communications domains. In this capacity, the message broker may provide message translation for the messages communicated between the plurality of communications domains. The message translation may include message translation schemes which are modular and configurable from a provisioning management system.

Message brokers which provide inter-domain message exchange may further be configured to provide authentication and authorization, as well as tunneling, for messages exchanged between the communications domains. Still further, the message broker may provide non-repudiation of message relay and screening in order to provide proof of message exchange transaction.

BRIEF DESCRIPTION OF THE DRAWINGS

FIG. 5 discloses a table which provides an example master merged service profile.

DETAILED DESCRIPTION

Disclosed herein is a system and method for providing dynamic and centralized service prioritization based on dynamic classification, registration, integration, and operation of a plurality of communications services such as one or more telephony, data, and/or video services. This system may be provided across multiple domains and for multiple providers of communications services. The system described herein may further provide for integration of user profiles (parameters, preferences, screening list, permissions, etc.), dynamic registration of the new services, monitoring of state across multiple services, and dynamic service prioritization and directed message distribution to appropriate services.

Figure 1:
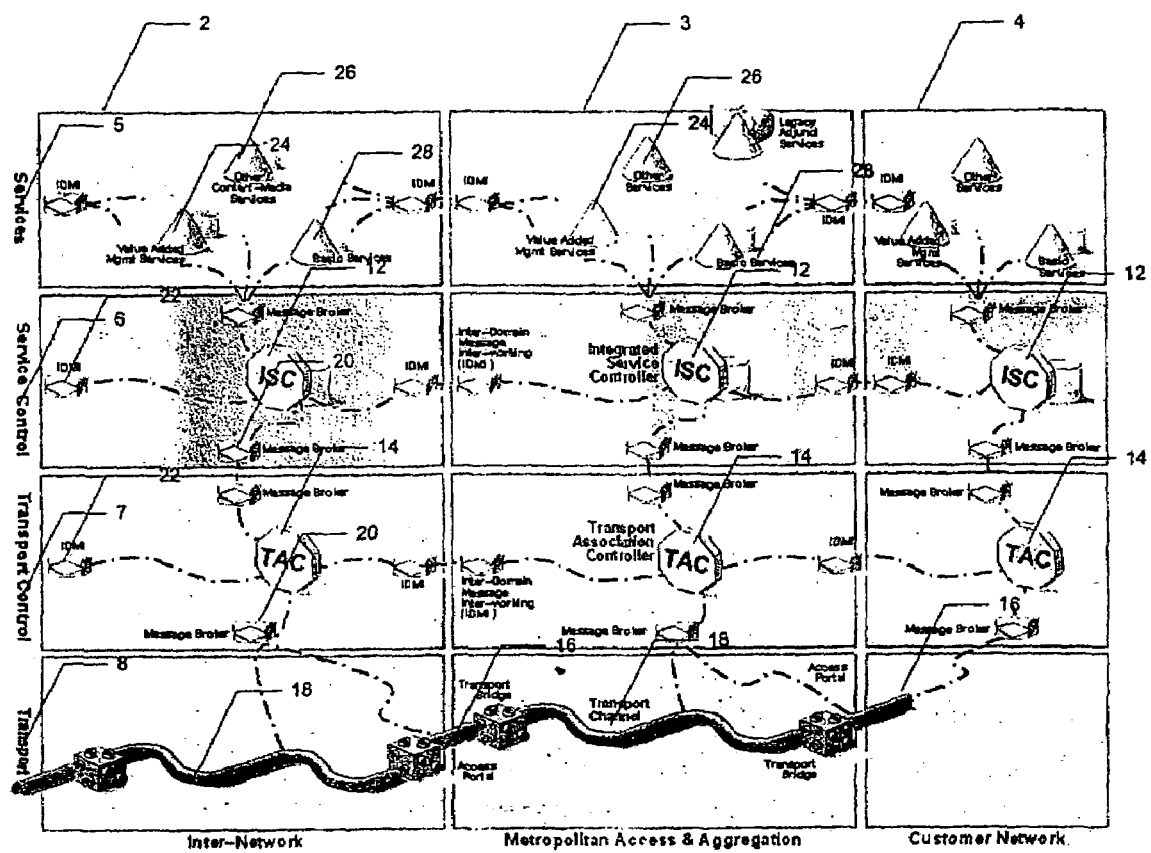
FIG. 1 discloses a system diagram for the service control functional architecture.

Disclosed in FIG. 1 is a diagram for a functional system architecture for providing the type of functions described above. The system 10 is displayed in a gridded manner in order to better understand the nature of its operation. Included in the system are one or more Integrated Services Controllers (ISC) 12. The ISC performs functions with regards to the dynamic classification, registration, integration, operation, and prioritization of communication services. In one configuration of the invention, one ISC would be related to each customer, however each ISC would support multiple levels of child ISCs. For example, one ISC might be related to each person in a family with a "parent" ISC representing the entire family. In a business setting, one ISC would represent each person in a company with "parent" ISCs representing the hierarchy of teams, departments, divisions, and the company as a whole. This invention supports an unlimited number of ISC hierarchy levels. As is seen, the ISC 12 operate in Service Control layer 6.

Below the Service Control layer 6 is a transport control layer 7. The Transport Control layer embodies functionality that manages lower layer media transport resources. Transport Control layer 7 also defines the communication state model. This control functionality is incorporated in a number of Transport Association Controllers (TAC) 14.

Below the Transport Control layer 7, is the Transport layer 8. The Transport layer may comprise any number of Transport Channels 18 for communication such as the public switched telephone network (PSTN), optical switching networks, the Internet, local area networks (LAN), or any other data network which includes any number of Access Portals 16 for media transportation between domains which may be monitored by the TAC 14.

The Services layer 5 embodies all of the "packaged" services delivered by a communications service provider, whether to end-users or other customers (wholesalers, inter-exchange carriers, etc.). Each service provides a set of capabilities that either directly manipulates and controls the underlying transport or augments other services that manipulate transport. In the scope of the present invention, a service provider is any entity that delivers one or more services to the customer. With regards to FIG. 1, service providers may include those who provide basic services 28, other content/media services 26, and value added management services 24.

Communication between the various layers is facilitated by Message Brokers 20. The Message Broker may be configured in any number of ways but is typically a signaling gateway configured to communicate across one or more control networks.

Returning again to FIG. 1, it is also seen that the various components of the system exist in vertical columns, which represent the domains over which the various system components may communicate. One domain shown includes inter-network domain 2 which may comprise such networks as IP-based networks with hosting capabilities or a long distance telephone networks. The metropolitan access and aggregation domain 3 may comprise the ILEC of Internet access networks. Finally, the customer network may include subsystems such as LAN's, PBXs, CTI, ACDs, servers, desktop personal computers, or simple telephones. In order to facilitate communications between the various domains the system includes Inter-Domain Message Inter-working (IDMI) apparatus 22. Capabilities of the IDMI apparatus include message translation, message security (with possible encryption), and non-repudiation capabilities.

Figure 2:
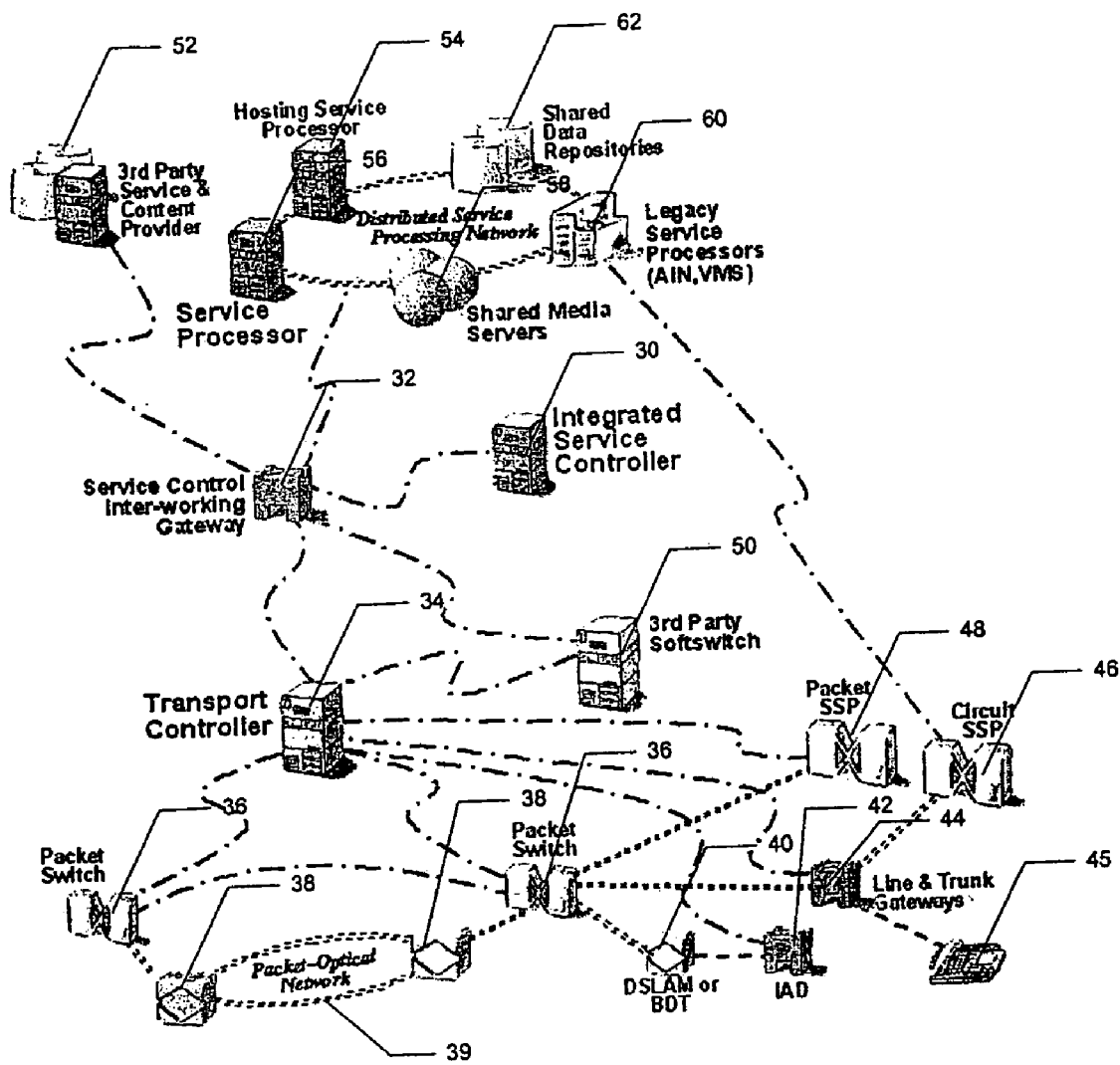
FIG. 2 discloses a system diagram for one configuration of the service control systems (physical) architecture.

Disclosed in FIG. 2 is one example configuration of the system which provides dynamically integrated communication service control as described herein. Included in the system is Integrated Service Controller (ISC) 30 which may comprise a network type server platform which is connected to any number of signaling/control networks via a service control inter-working gateway 32. Through gateway 32, ISC 30 may communicate with any number of networked system components.

One connection established through gateway 32, may be to Transport Association Controller (TAC) 34. TAC 34 is configured to provide control functions for various transport type resources. TAC 34 may also comprise a network server type platform with interconnections to one or more data networks.

Continuing on in FIG. 2, it is seen that TAC 34 is in connection with packet switches 36 which provide switching for data transported over packet based (and possibly optical) network 39. The packet switches 36 are in connection with optical switches 38 located at the edge of the optical network. The switches may provide for the transmission of voice-over-data information or just data over the optical network. Control of the packet switches may be provided through packet Service Switching Point (SSP) 48 which is also in connection with TAC 34.

Other connections established with TAC 34 include connections with integrated access device (IAD) 42 which in turn is in connection with digital subscriber line access multiplexer (DSLAM) 40 for packet broadband access (combined voice, data, and video capabilities).

Still other connections established with TAC 34 include lines and trunk gateways 44 which are part of the next generation Public Switched Telephone Network (PSTN). The gateways 44 provide for the establishment of telephony connections over the PSTN by parties employing the telephone 45. As can be seen, a connection can be established from gateways 44 or to one or more circuit SSP 46. If the SSP 46 is part of an SS7 type telephony network, further connections may be established to components of the Advance Intelligence Network (AIN).Other connections establishable through gateway 32 from ISC 30 are to the various platforms employed by communications service providers. In one configuration of the system architecture, individual services have the capability to execute on different service processor platforms in a distributed processing environment. It also provides for a degree of interworking with existing legacy service platforms (such as Advanced Intelligent Networks (AIN) and/or a Voice Messaging System (VMS)), and support for independent third party service and content providers.

As part of the configuration of the invention shown in FIG. 2, the communication service provider may operate a distributed service processing environment, wherein the processing network may include a number of internal components such as Service Processor 56, Shared Media Services 58, Hosting Service Processor 54, Legacies Service Processors 60 which support functions such as AIN and VMS, as well as a Shared Data Repository 62. Also, the communication service provider may be configured as a $3^{rd}$ party service and/or content provider. As such, connections from the ISC through gateway 32 may be established to a third party service and content provider 52 configured on a network server platform.

Alternatively, one skilled in the art would realize that the functionality disclosed in the components shown in FIG. 2 may be implemented in any number of configurations. More specifically, multiple system elements could deliver the functionality of the ISC, the TAC, and the communications services. Also, system elements could be configured to deliver two or more functional capabilities on a single platform as long as the interfaces between those functional objects are preserved. For example, individual communication services and the ISC functionality could both execute on the same platform. Likewise, the inter-domain message interworking (IDMI) function, the message brokers, and ISC might all be delivered on a common system platform as long as key interfaces between each functional capability is preserved.

Figure 3:
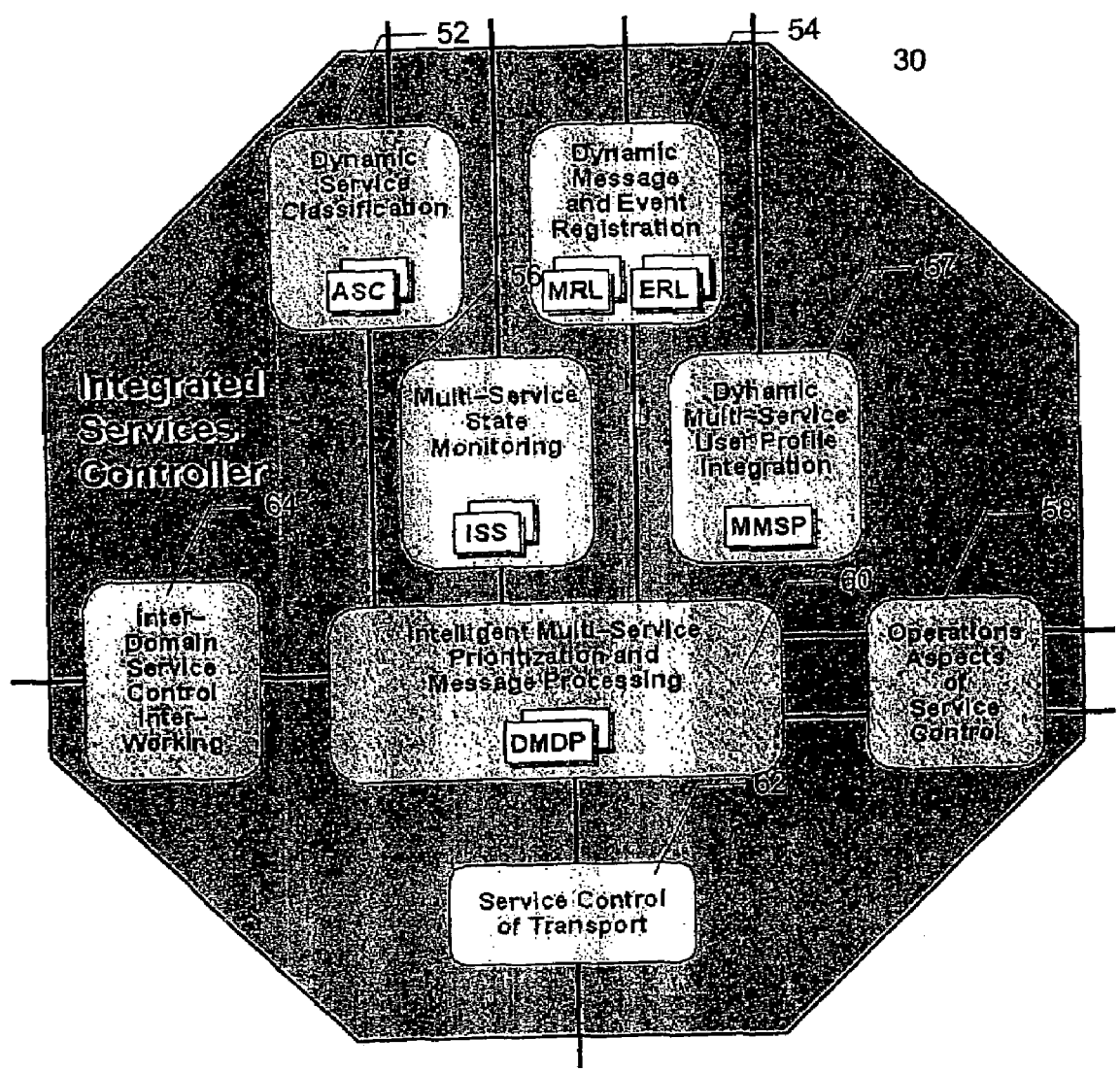
FIG. 3 discloses a functional block diagram for the Integrated Service Controller (ISC).

Disclosed in FIG. 3 is an internal block diagram for ISC 30 which shows in particular various processing modules employable by the system in performing the functions described herein. Specifically, included in the processing modules are a dynamic service classification and registration module 52, a dynamic multiservice user profile integration module 54, a multiservice state monitoring module 56, an intelligent multi-service prioritization and message processing module 60, service control of transport 62, operations aspects of service control module 58, and an inter-domain service control and interworking module 64. In short, each of these modules provides for the dynamic integration of multiple services, organization of the customer preference information with regards to the communication services, the monitoring of the transport, and the intelligent prioritization and distribution of messages.

With regards to the dynamic service classification module 52, every service performs its actions relative to one or more events that occur in the system. Predominantly these events will occur at the Transport Control layer relative to messages and state information embodied in the control of communications transport resources. Events can also occur independent of Transport and/or Transport Control. An example may include: clock-based timers (within a service, or external to a service). In the simplest case, an event occurs which creates a message that invokes a service. The service performs its actions—which may include sending and receiving one or more messages to other functional objects in the system—and then concludes. These messages may be directed for the Transport Control layer or for other services.

For the system to support services that are created on-the-fly (i.e. dynamically), that is, after the service controller (ISC) is deployed, each service must have a way to notify the ISC of the messages that it needs to be notified of. The ISC may have a dynamic method to determine, when two or more services request notification for the same message, whether all, some, or just one of those services receive notification in the ordered sequence or all at the same time. Thus, the ISC needs a way to classify each service to determine the order to relay a message notification to services when two or more services register interest in any same message.

These requirements lead to the execution of a number of internal processes. Each process occurs when a service is activated (provisioned) for a specific customer. Disclosed in FIGS. 4a-d include flowcharts which describe in general and also in detail the processes performed during the initiation, classification, and registration process. A first process performed includes service activation and initiation. Every service for a customer—including dynamically provisioned services—is always activated through one or more action messages (commands) from a provisioning function. Even if some other event or service in the system requests activation of a service that action request must first flow through a provisioning function that checks for authorization (is the customer able to order that type of service and has the customer paid their bill?), availability (is it a service being sold that day and available to that customer?), and any other appropriate service ordering and activation parameters. This also initiates appropriate Fault Management, Configuration Management, Account Management, Performance Management and Security Management (FCAPS) (operations) capabilities to allow the service provider to properly manage the service.

Once a service has received the appropriate activation commands, either directly from the provisioning system or via the ISC, it is initiated (400 and 401). The initiation process can be performed in multiple ways. One option is for the provisioning function to initiate the service on behalf of the service (402 and 403). In another configuration of the invention, the service initiates itself with the ISC directly.

The step of commencing service configuration is then performed 404. Then a determination whether the service has requested classification is made 405. Depending on the result, the process described in FIG. 4b may be performed. Then a determination whether the service has requested message and event registration is made 406. Depending on the result, the process described in FIG. 4c may be performed. Then a determination whether the service has requested profile configuration is made 407. Depending on the result, the process described in FIG. 4d may be performed. Then service operations and configurations are monitored 408, and continue to be monitored until a classification, message registration, or profile change has occurred 409, at which point the process returns to commencing service configuration 404.

After initiation of a service, the ISC needs to determine the service's classification and the one or more messages that the service needs to be notified about. The steps performed in the dynamic service classification process are disclosed in the flowchart of FIG. 4b. In a preferred embodiment of this invention both of these capabilities are performed automatically between the service and the ISC. Automatic Service Classification (ASC) is based on a service's capabilities wherein the service declares its capability sets to the ISC which will result in an ASC across one or more categories. The ISC then, based on any of numerous possible algorithms, will use a service's ASC information to determine how to prioritize (order) services for each message that the ISC processes. The message types which a communication service wishes to receive are then identified. Possible embodiments of ASC categories are detailed below.

Automatic Service Classification, through a dynamic message exchange between the service and the ISC, may require more than one iteration to fully determine a service's capabilities and appropriate classification. While it begins with the service declaring its self-determined classification based on criteria categories like those listed below, it might also involve subsequent inquiries from the ISC with responses from the service 410. This dynamic service classification and negotiation dialog is employable in enabling dynamic service registration and plug 'n' play 411 and 412. After sufficient negotiations have been performed the ISC will determine a final ASC for the service 413. Service classification categories, and their possible parameters include, but are not limited to what is disclosed in the following table:

Service Classification

| Service Classification Categories: | Parameter Values: | Examples-Description: |
|---|---|---|
| Service Identity | Names Aliases Globally Unique Digital Identifiers | Means of uniquely and unambiguously identifying and referring to a particular service (implies a means to authenticate Identity also) |
| Emergency Priority | Government-Public Emergency Service Individual-Personal Emergency Service Government-Public Warning Service All Other Public-Private Services | GETS 911 Emergency Preparedness . . . |
| Service Provider | Local Domain Provider (Home) Guest Provider in Local Domain Foreign Provider in Another Domain | Who is providing the service and therefore how much should the service be trusted-secured |
| Dependency | Independent Service Service Modifies Behavior of another service Service Behavior is | Specifies dependency to another specific service |

Service Classification -continued

| Service Classification Categories: | Parameter Values: | Examples-Description: |
|---|---|---|
| Connectivity (Mode) | Modifiable by other objects Service Collaborates with another service Connection-Oriented (CO) Connectionless (CL) | Whether a communication association requires specific: 1) establishment, 2) transmission, 3) disconnection stages (CO), or, is single message oriented (datagram transmission) without specific establishment and disconnection stages (CL). |
| Manipulates Transport Associations Bearer Content | Yes No (e.g. a Read-Only Monitor service) Possible additional transport-specific parameters | Does the service directly manipulate transport bearer content (e.g. 2-way call, video streaming, Dynamic DSL, . . . ) |
| Augments Control of Transport Associations | Yes No | Services that augment, or might change control behavior of, a "basic" association service. Call Waiting, Instant Message No Solicitation, and URL Screening are examples. Key notion is that they modify existing associations established by a service that "Manipulates Transport" |
| Type of Association Augmentation | Screening Inbound Associations Screening Outbound Associations Routing Bandwidth Control (Thruput Rates) Latency/Delay/Priority Other Performance/ QOS modifications | |
| Association Media Type | Voice Video Information Multi-Media | |
| Association Flow | One-Way (Stream) Two-Way (Dialog) Multi-Way (Conference) | Drives basic Association Topological Configurations. |
| Message Source | Only Msgs within the same domain Messages from other domains | Where is the message originating from? |
| Service Invoker | Only Msgs within the same domain Messages from other domains | "Who" can start the service |
| Service Privacy | Private Restricted Visibility Public | To what degree can other services know about "me" |
| Remote Use | Local/Home Only Remote Only All | Can the Service be invoked by an event originating outside of the Local/Home Service Provider Domain? |
| Security and Trust | Various security (or "trust") "Levels" | Functions of Authentication, Authorization, Access Control Allow or Limit various Service |

-continued

Service Classification

| Service Classification Categories: | Parameter Values: | Examples-Description: |
|---|---|---|
| Shared Resource/Data | Read Only (or Monitor) Write Only (or Manipulate) Read & Write | Capabilities and Access to Resources/Data The degree to which a service can share resources or requires dedication (or locking) of resources |
| Priority of Msg Delivery | Message Communication Priority-tbd | When congestion occurs in the signaling/control transport infrastructure, a prioritization scheme is required to ensure the Messages associated with critical time-bounded signaling functions are are communicated as soon as possible. |
| Business SLA (Service Level Agreement) with Service Provider | ? ? | Indicates whether special consideration should be given to specific services given an SLA. |
| Events Static Registry | Event Static Info Notification Interface Static Info | Any specific event information that needs to be statically maintained. Information for use by Dynamic Event Notification Function. |

Further, a Service Message Registration (SMR) process may be performed. The steps performed for this dynamic message and event registration process is described in the flowchart of FIG. 4c. Each service identifies to the ISC the complete lists of all messages—a Message Registration List (MRL)—it is interested in along with any additional parameters (state, settings, originator of messages, etc.) that it needs in order to process the message.

In addition to communicating a Message Registration List (MRL) to the ISC 414, each service may also communicate an Event Registration List (ERL) to the ISC 415. While messages and events are related, they do not necessarily comprise a one-to-one mapping, though the relationship between many events is a one-to-one mapping to a specific message for that event. Then the MRL-to-ERL mappings are computed and stored 416. The ERL from each service defines the specific events that the service needs the underlying transport resource (i.e. Transport Control and Transport layer functions) to monitor for and the MRL defines the specific messages that the service expects to receive. The ISC re-registers the ERL with the Transport Association Controller (TAC) 417. The ISC applies its internal processing intelligence to dynamically order each service for each message to determine their relative priority. Because the current state of services is constantly changing, so too the message distribution order may also change from moment-to-moment. The ISC stores the results of its intelligent processing in a Dynamic Message Distribution Prioritization (DMDP) for each message 418.

Figure 4A:
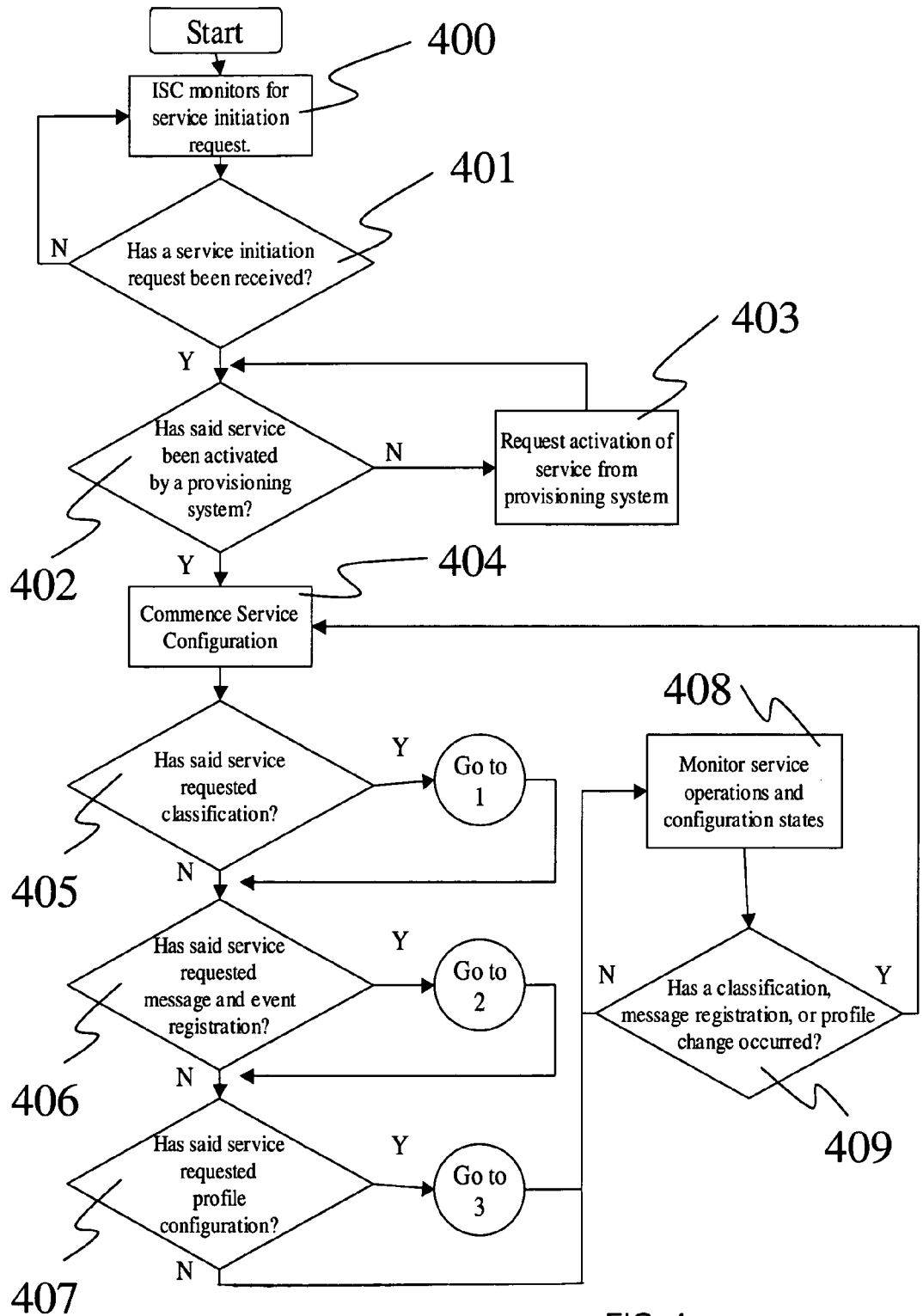
FIG. 4a discloses a flowchart in which describes the overall steps performed during automatic service initiation, classification, registration, and integration.
Figure 4B:
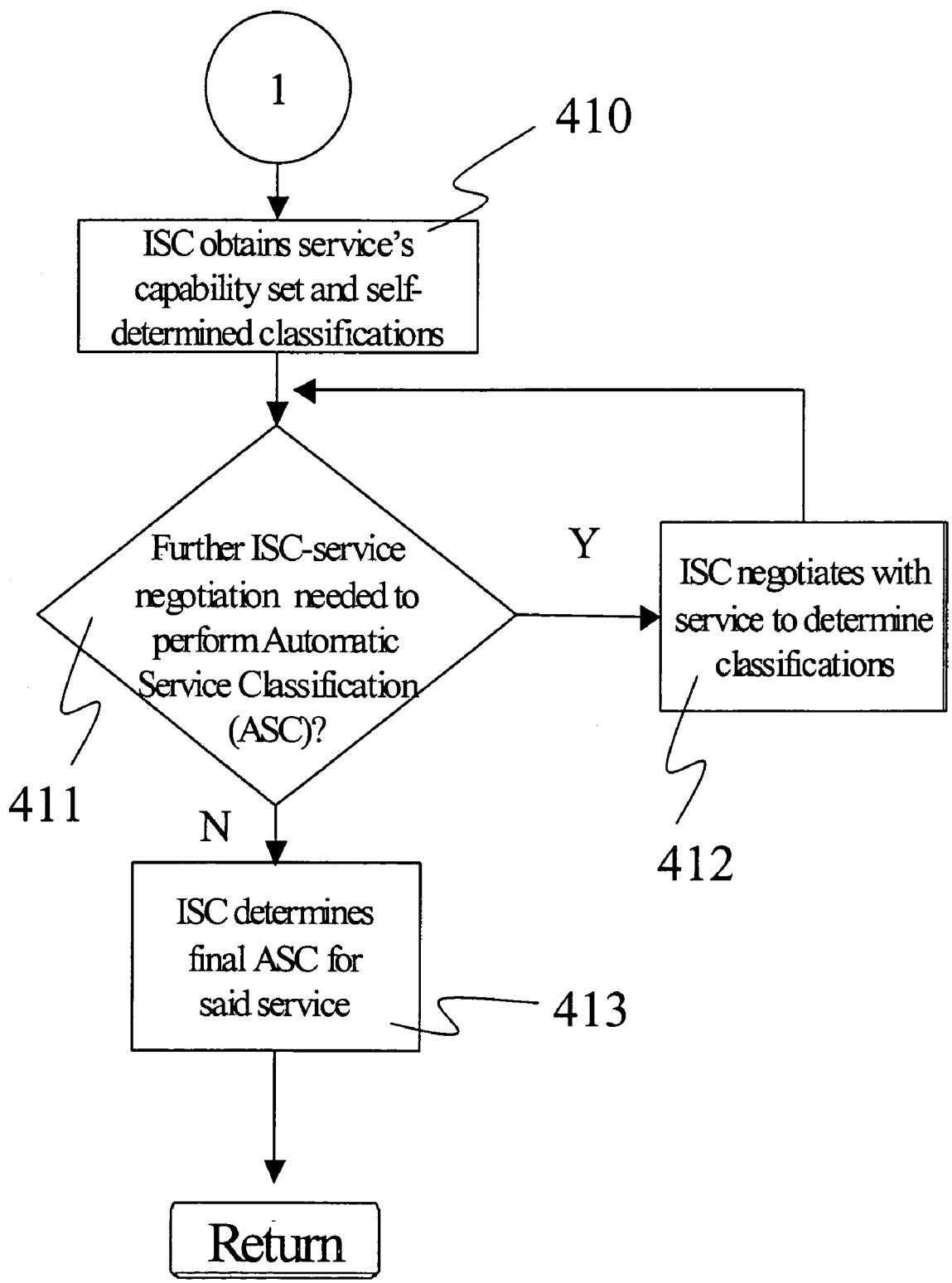
FIG. 4b discloses a flowchart for dynamic service classification.
Figure 4C:
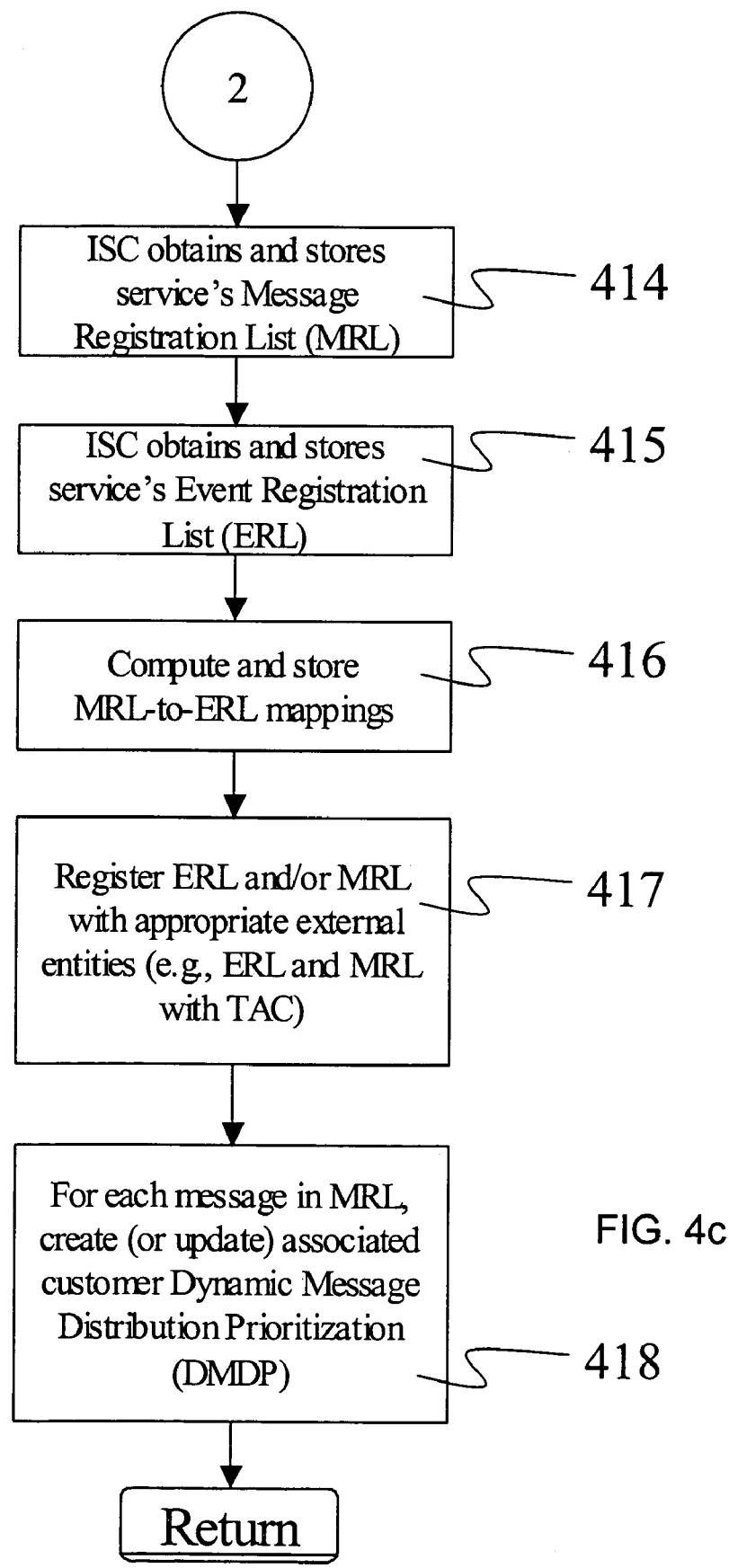
FIG. 4c discloses a flowchart for dynamic message and event registration.
Figure 4D:
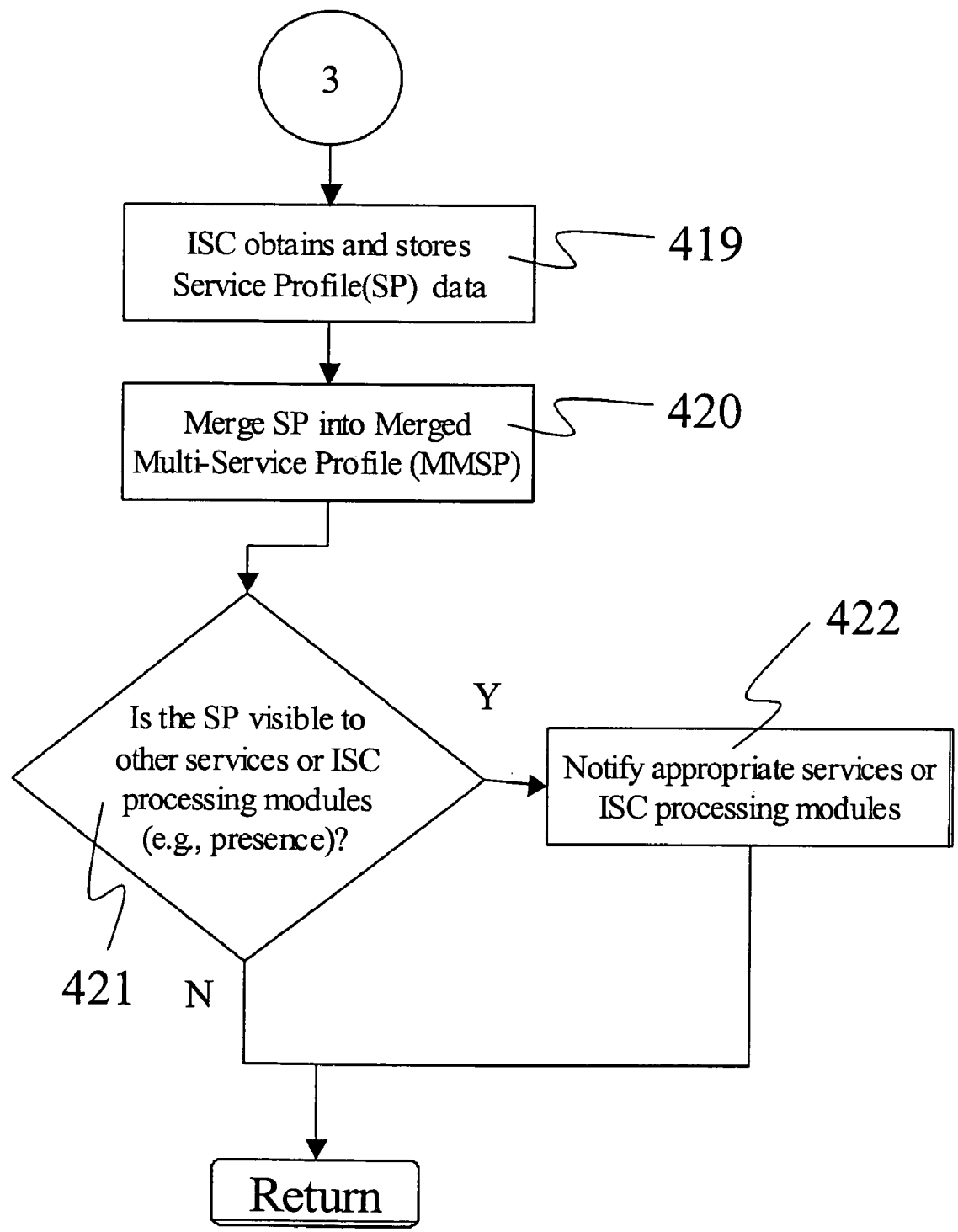
FIG. 4d discloses a flowchart for customer and service settable profile integration.

Once services are registered and integrated, a profile for a user may be defined through use of dynamic multi-service user profile integration module 54. Disclosed in FIG. 4d is a flowchart which describes the process performed for customer and service settable profile integration. Most existing communications services store information (parameters, preferences, screening lists, etc.) defined by the customer. This may be done using proprietary formats that are only visible to the communications service itself. As a result, a customer may be forced to enter the same keyed data (e.g. telephone number) over and over again for each of the different services.

According to the invention described herein the dynamic multi-service user profile integration module 54 provides a means for generation of a Merged Multi-Service Profile (MMSP) like that illustrated in FIG. 5. Each communications service will manage 419 a Service Profile (SP) that contains one or more of the Master Key Fields and may comprise one or more Service-Specific Fields which is dynamically merged 420 with the MMSP by the ISC. As a result, customers do not need to interact with each service individually to set their profile screening list and preferences which would require re-entering data for the Master Key Fields for each service. Instead, the ISC provides an integrated user interface (graphical, auditory, textual, touch-tone, etc.) to the MMSP where the customer can easily configure all services at once, having to edit the primary keys for each entry only once. Then a determination is made whether the SP is visible to other services or ISC processing modules 421. If so, the appropriate services or ISC processing modules are notified 422.

As can be seen in FIG. 5, the MMSP 200 illustrates an example of an MMSP with multiple columns of information set for multiple rows of both service and customer entries. The rows in the MMSP are divided into two sections (230 and 232) with the upper section representing service-settable parameters 230 and the lower section of rows representing customer-settable parameters 232. Alternately, the MMSP might be implemented as two or more separate tables supporting the same functional capabilities and integration.

The customer-settable rows, for example, might represent incoming callers the customer wants screened against criteria illustrated in the Service Specific Fields (214, 216, 218, 220, 222, 224 and 226). Alternately, the rows could also contain entries with one or more Master Key Field identifies (e.g. phone numbers, IP addresses, e-mail addresses, etc.— 204, 206, 208, 210, 212) that define possible communication entities (e.g. other people or web sites) for which a particular service should perform a specific set of actions. Regardless of what actions (screening, forwarding, etc.) that a service performs relatively to entries in its SP, the MMSP provides a merged information structure that allows the customer to enter individual entries, and their Master Key Fields, only once across all of that customer's services.

The service-settable rows in MMSP 200, for example, might represent device state or location information for the one or more devices associated with a customer. Each service may also define a visibility attribute 228 which allows the system (ISC or service) or the customer to restrict access to specific fields for other services. While the ISC might present an integrated viewable user interface of the MMSP (like that shown above) to the customer it may be necessary to not allow specific services to "see" or access information managed by other services. This visibility may only apply to other services registered for the customer—not other services registered for other customers, or visibility to other customers. "Phone number" or "Identification" privacy is orthogonal to this attribute—and could, in fact, be implemented as another specific service. One embodiment of the integrated MMSP might be a LDAP (Lightweight Directory Access Protocol) directory, though other technologies would also be suitable.

The MMSP could physically be implemented in a variety of ways. Preferably the ISC only maintains a "snapshot" copy of each service's individual SP. This snapshot is updated each time a customer adds or deletes a service or edits the data within the profile. The Master copy of each SP should be maintained by each service. In an object-oriented implementation the MMSP would be contained within the ISC as part of its internal data. Alternately, in a process-file-oriented implementation the MMSPs for each customer ISC could be implemented in a centralized database.

Today instant messaging services provide presence and availability information indicating whether a user is online and whether they allow that fact to be known by other users. The wireless world is quickly moving toward location-sensitive services that deliver information (notices, advertisements, etc.) to customers based on their immediate location (e.g. ads as they walk by a store). In both cases, these presence and location sensitive capabilities are typically isolated to those vertical service areas. They are not integrated with other services.

This invention supports the opportunity for a much higher degree of integration. With presence (including, but not limited to: device state, device location, device network address, device state visibility, and other device attributes), and availability ("who can see me," "what device am I, a specific person, at"), information integrated into the ISC's MMSP then other services can access that presence and availability information to effect their processing.

In a preferred embodiment of the invention, the presence and availability information would be managed by a Presence and Availability service (or two or more services for Presence, Availability, or other related information) in the Service Layer. This service, or services, would merge their data with the ISC's MMSP and make it available to other services (i.e., make it "visible") or the Presence and Availability Service might register its data with the ISC, similar to Service Classification and Message Registration. The exact mechanism is left as an implementation option.

The Multi-Service State Monitoring module 56, along with registering communications services with the ISC, is also configured for monitoring the "high level" state of each service (e.g. active/inactive, setting up/processing/completing, etc.) The ISC monitors the "high-level state" of each Service Director it has registered. This is different from the association finite state model embodied in Transport Control. The high-level state might include the possible values: Idle, Setting Up Association, Association Established, and Releasing Association. These state values are very generic and probably apply to all types of associations (data, voice, video). It is important for the ISC to monitor (be informed of) the current state of each service, as another factor influencing intelligent message prioritization. It is important to note, that not all services, in fact, few services, might progress through all the states listed above. Many services will only support one or two high-level states relative to an association.

For example, consider the simple service example of 2-Way Call, whether over packet or circuit. In a preferred embodiment of this invention the first call (whether outbound or inbound) employs a 2-Way Call Service. When another party attempts to call the customer a second Transport Channel (at the Transport layer) is created which attempts to connect with the customer's Access Portal. A "termination attempt" event is detected and a corresponding message sent from Transport Control to the ISC. The ISC knows that the 2-Way Call service is in an established association and given its prioritization rules (since no Call Waiting is present) delivers the termination attempt message to the 2-Way Call Service. The 2-Way Call Service, unable to handle N-Way Calls, returns a "busy and deny connection" message to the ISC which relays it to the Association State Manager (ASM). The ASM provides the actual state model for controlling a specific transport association. It also manages the relationship between a Transport Channel (TC), a Transport Channel Access Bridge (TCAB), and an Access Portal (AP).

Now let's consider the example when the customer does have Call Waiting in addition to 2-Way Call—a service set that all customers, whether business or residential, whether over packet of circuit, can use. In this case, when the ISC receives the "termination attempt" message from the ASM for the new call, it uses the state information from the first call to determine that "when a 2-Way Call is in progress AND Call Waiting is available, send the message to Call Waiting, otherwise send it to 2-Way Call." Of course, rules like this would be expressed in generic terms not product specific terms. The ISC would send the message to the Call Waiting service which embodies the logic for what kind of indicator (auditory, visual Caller ID, recorded intro from the new caller, or perhaps even the new caller's photo) to send to the customer. In turn, the Call Waiting service would manage the hand-off between the first 2-Way Call and the second 2-Way Call. In this example, the ISC's knowledge of monitoring the state of each service directly impacted the rules for intelligent message prioritization.

Intelligent Multi-Service Prioritization and Message Processing module 60 provides for the processing of messages exchanged between the various entities of the system. Specifically there may be at least three types of service-related messages employed for exchange between services, the ISC, the TAC, and other objects—collectively referred to as entities. These include:

Inform Messages: wherein one entity wishes to inform, that is, notify another entity about something in the system, one common situation is that an event has occurred. These messages may also include multiple data items (e.g. state information, parameters, current variables, etc.) that the requester of the event notification might have asked for.

Request Messages: One entity requests information or instructions from another entity.

Instruct Messages: One entity instructs another entity to perform an action. This includes an entity instructing another entity to "watch for" an event and then return an Inform message (notification) along with specific data when the event occurs.

The ISC is operative to prioritize and appropriately dispatch all messages, whether those messages are directed to a service or to a Transport Association Control entity. This assures that each message is delivered to one or more services in priority order. A Dynamic Message Distribution Prioritization (DMDP) is created by the ISC for each message and is employed in the processing for each message registered with the ISC. Criteria employed in the creation of the DMDP may include:

Automatic Service Classification (ASC),

ISC Service Provider Policy (SPP), and

Customer Classification (CC) (see below)

Customer's Preference Order (CPO) (a service priority list customized by the customer), Current State of Services, ISC Service Prioritization Rules (SPR)—which could differ for different embodiments of an ISC.

Possible Customer Classification (CC) categories may include, but are not limited to:

| Customer Classification | | |
|---|---|---|
| Service Classification Categories: | Parameter Values: | Examples-Description: |
| Customer Priority | Platinum Customer GOLD Customer Silver Customer Bronze Customer White Customer | An overall rating defined by each network domain provider (owner) that reflects the overall priority for each customer. The ratings might permeate the service architecture (e.g. Platinum messages between objects are always delivered before other levels . . . ). This rating might reflect how much money the customer spends on services. |
| Customer Billing Status | Paid/Current Overdue Delinquent Termination In-Progess Terminated | This may reflect whether the customer pays their bill on time each cycle, or whether they are habitually late, or delinquent . . . |

The customer classification criteria may be stored within and determined by the ISC, however, in a preferred embodiment this customer information is managed by an operations support system performing customer accounting functions. The operations function is operable, through one or more messages, to exchange customer classification information with the ISC as well as other system entities. The ISC uses the customer classification information as one of possibly multiple criteria to determine the relative prioritization of services wanting to receive the same message. Other system entities, like a Message Broker (MB), might use customer classification as one of possibly multiple criteria to determine the order to relay messages it receives on to other system entities.

In most cases the ISC will route a message intended for a service to the first (top priority) service in the DMDP for a specific message. In other situations, the DMDP might define an "application chain" of services that will receive a message in sequential order. The combination of the classifications, service provider policies, customer preference order, the current state of each service, and the ISC intelligent prioritization rules determine how the ISC dispatches a message. The possibilities may include: dispatch only to the first service (in priority order) or to dispatch to each service in sequential order waiting for the previous service to indicate service completion, dispatch to each service in sequential order waiting for the previous service to indicate current message action is complete, dispatch to all services simultaneously, dispatch to specific services in list (a sub-list given current state . . . ), and dispatch only to the last service In addition to determining the prioritization of services for delivering a specific message, the ISC must also determine the destination—that is, the appropriate service instance to which the message should be delivered—for each message.

Figure 6:
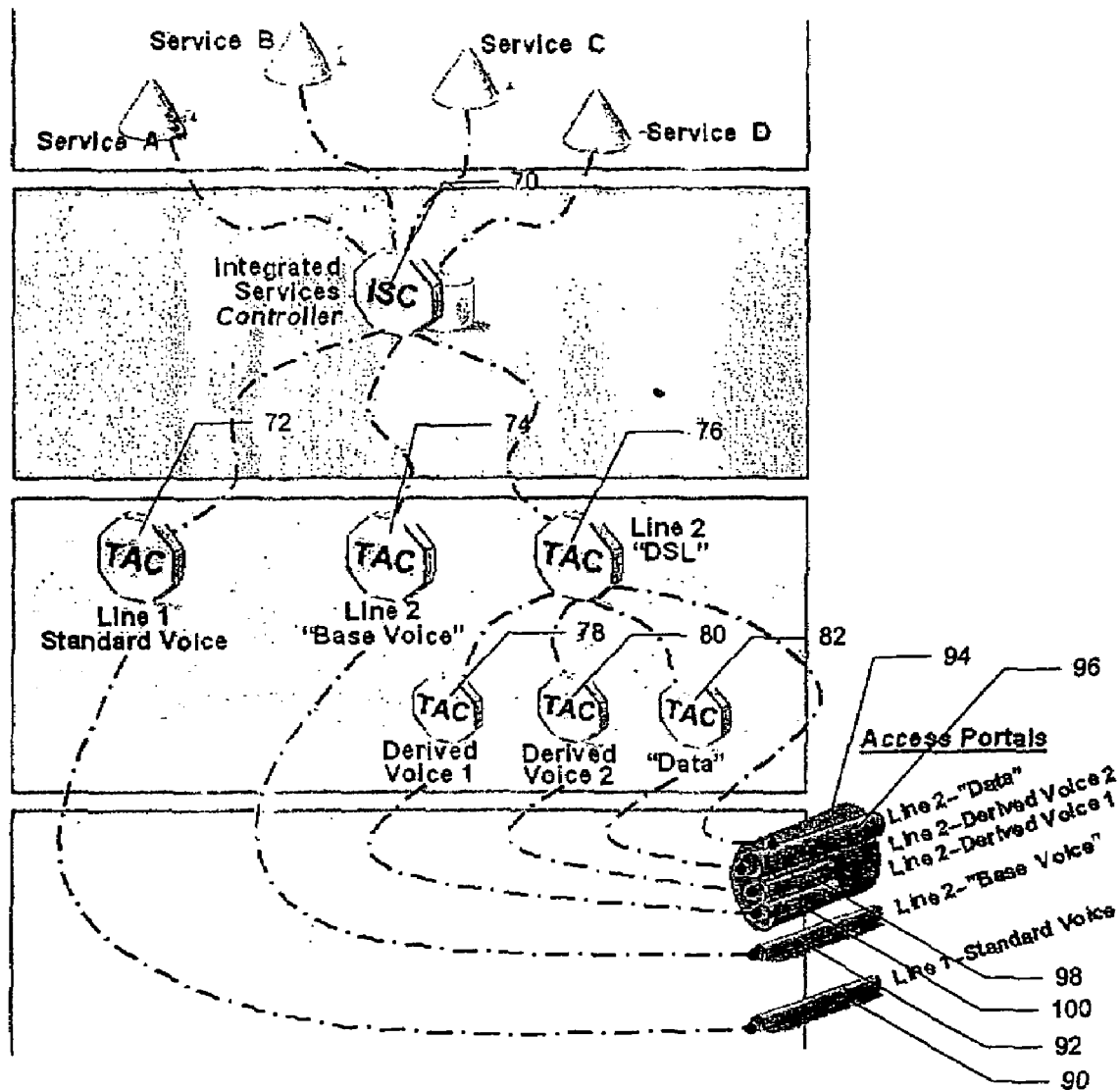
FIG. 6 discloses a system diagram which shows the interconnection between the Integrated Service Controller (ISC) and Transport Association Controllers (TAC).

For messages directed to Transport Association Controllers (TACs) a similar type of message management is provided by Service Control of Transport module 62. The ISC relays messages to, and receives messages from, one or more TACs embodied in the Transport Control Layer. Disclosed in FIG. 6 is an example configuration of these capabilities. It shows the connection between the ISC 70 and the plurality of TAC's 72-76. Each Access Portal provisioned for the customer has one and only one TAC associated with it. Access Portals carry the "bearer" content of an association across domain boundaries. Each access path (i.e. wireline, wireless channel, DSL channel, T1 channel, ATM, etc.) in or out of either side of a domain (e.g. customer terminating line, inter-exchange carrier trunk facility, . . . ) is modeled as an Access Portal (AP). Each AP represents (and can communicate to other objects) the characteristics of that portal including, for example, its physical transport capacity, its current transport utilization, the media formats it supports (including built in CODECs or format converters), etc. It also embodies a simple state model for transport "flow" (either a "circuit connection" at an electrical level, or packet flow).

In the example shown, TAC 72 is associated with a wireline Access Portal 90 configured for standard voice. TACs 74 and 76 are associated with another wireline configured for a "base voice" Access Portal 92 with a DSL Access Portal 94 that uses the upper frequencies on the same wireline. Because DSL line 94 is configured to operate according to multiple modes of communication, in this case voice lines 98 and 100, and data line 96, Access Portals are assigned for these lines which in turn are monitored by TAC's 78, 80, and 82 respectively. As such, customers with multiple Access Portals (e.g. PhoneLine 1, Line 2 as a DSL service with a separate "base voice" portal, 2 derived voice portals, and 1 data portal would have 6 TACs) would have multiple TACs associated with each ISC.

FIG. 6 illustrates some of the primary functions of the system, with the following paragraphs describing their basic operation. Once the one or more communication services are activated and initiated (which includes the classification, registration, and integration steps described above), and the ISC has relayed message registration (the MRL) and event registration (the ERL) to the TAC, the ISC is operative to monitor the state of the one or more services for its customer and to receive messages. Messages received by the one or more TACs may invoke an event to occur, or other non-message related activity may invoke an event. The corresponding TAC then processes the event against its Event Subscriber Registry (ESR)—the compilation of multiple Event Registration Lists (ERLs) from multiple services—to determine whether any services have registered interest in that event and what messages were requested. The TAC generates the appropriate message(s) and relays it (them) to the ISC.

Figure 7:
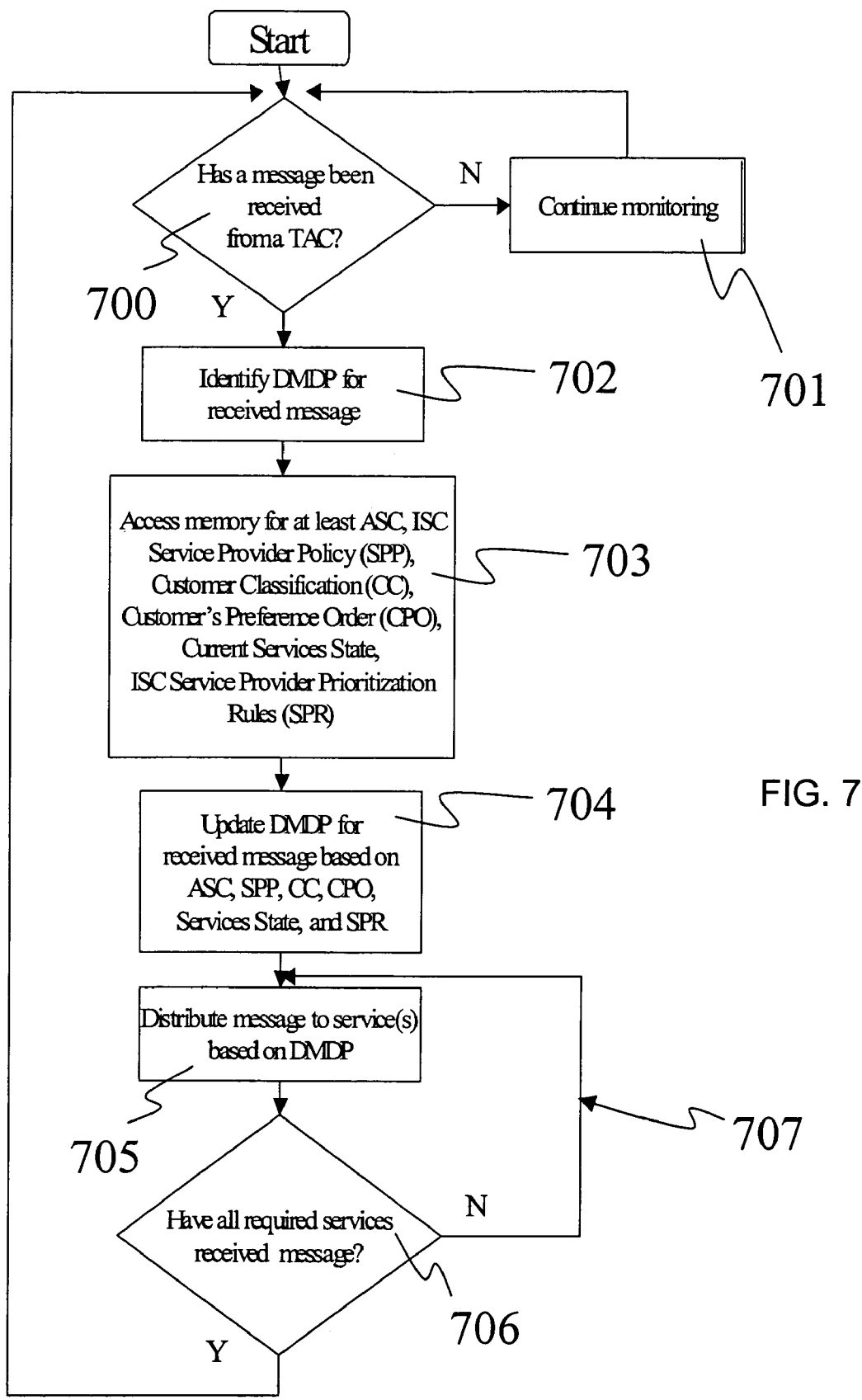
FIG. 7 discloses a flowchart which describes in detail the steps performed by the Integrated Service Controller in response to a message from a detected event at an access portal.

The processes performed by the ISC in responses to a detected event at an access portal are disclosed in the flowchart of FIG. 7. The ISC determines 700 whether a message has been received from a TAC, and continues monitoring 701 until such receipt. Upon receipt of a message from the TAC or other system entity, the ISC instantly updates the Dynamic Message Distribution Prioritization (DMDP) for that message 702. Memory for ASC, ISC Service Provider Policy (SPP), Customer Classification (CC), Customer's Preference Order (CPO), Current Services State (CSS), and ISC Service Provider Prioritization Rules (SPR) is then accessed 703. The instant update includes any possible recent changes to the customer's classification, the customer's service order preferences, the current state of all services, any other classification criteria, and is processed using the intelligent prioritization rules built within the ISC 704. The resulting DMDP—at that moment—is used by the ISC to dispatch the message 705 on to the appropriate service, and depending on the situation, to possibly wait 706 for a reply. When reply messages are received from a communication service they are processed accordingly. The ISC may be further configured to retransmit the message 707 to the communication service if a reply message is not received within a particular period of time. The ISC is configured to receive multiple types of reply messages from a specific service. In addition to "service completed successfully," or "service aborted with an error," a service might also return a "pass" reply. This indicates to the ISC that the service did not perform any functions (e.g. it was "off" at the time) and the ISC should determine if the message should be distributed to the next service in the DMDP. Of course, many other types of reply messages are anticipated by the inventors. Fault and performance management messages may also be logged in this case.

Through inter-domain service control and inter-working module 64 communications with multiple service providers over multiple domains may be accommodated. As was mentioned above, each customer, or person in a customer group, has an ISC. Because, however, this invention supports multiple service providers, a customer might purchase services from more than one service provider, where each service provider might deploy services in more than one domain. In addition, distributed intelligence requirements may also dictate that multiple ISCs within a single provider domain must inter-operate, where each ISC has the ability to establish inter-working relationships with other appropriate ISCs. To accommodate distributed service control entities that in turn can support multiple services, in multiple (or single) domains, possibly from multiple service providers, either one ISC is established as the Master ISC, or multiple ISCs may inter-work as peers. The degree of integration between ISCs—that is, the commands (instruct messages) allowed to other services and other ISCs in other domains— is directly related to the degree of trust the Master ISC has for the other ISCs and the other services. ISCs that do not inter-operate with other ISCs are considered standalone ISCs.

With a Master ISC inter-working with Remote ISCs in other domains, the customer receives a degree of integration of multiple services across domains. In this scenario, messages are delivered to services across multiple domains based on a single DMDP for each message in the Master ISC. To support this type of distributed and integrated service control each customer must establish a Primary Service Provider (PSP) and Other Service Provider(s) OSP(s)—whether selected explicitly by the customer (similar to choosing a long distance phone provider today) or determined automatically by the system. Their Master ISC is always provided by the PSP, whether that is the local incumbent local exchange carrier (ILEC) (in a local/metro network) or a competitive local exchange carrier (CLEC) located in another domain. Other ISCs are provided by the one or more OSPs for a customer. The Master ISC inter-works with the one or more OSP ISC(s) through a special message interface.

For example, suppose a customer receives basic 2-Way Voice Calling, Priority Call Waiting, and Dynamic DSL from their "local" network provider (who also provides as the PSP the customer's Master ISC.) and Instant Message Deluxe, Web URL Screening, and Video-Multimedia Family Gathering (a video conferencing service) from an OSP. The first three services would register with the Master ISC in the PSP's domain. The last three services would register in one of two ways. First they would register with the Other ISC in the OSP's domain and in turn, the Other ISC would re-register each service with the Master ISC over a secured inter-domain interface. Alternately, the last three services in the OSP's domain could register directly with the Master ISC over a secured inter-domain interface. In either case, the Master ISC maintains the primary registration for all services, regardless of domain and service provider. Depending on the degree of trust the PSP places in each of the one or more OSPs, the Master ISC may restrict, including disallow, specific messages to and from services provided by an OSP in another domain.

This method establishes the Master ISC as the initial and master control of intelligent multi-service message prioritization. Because the customer can equally choose any service provider as their PSP this creates a level competitive playing field and also allows new service providers to dynamically deliver new services to any customer.

Alternately, Peer ISCs (e.g. an ISC in a customer network and an ISC in an ILEC network, or an ISC in an ILEC network and one or more ISCs in other OSP networks) may collaborate and exchange some messages, however, each ISC maintains its own registration of services within its domain and its own DMDP for each registered message. As such, some services may "collide" as they compete for un-mediated, un-integrated transport resources including discrete event notifications. Other services may co-exist harmoniously, but the key deficiency in this case is that with Peer ISCs services across domains are not integrated. In this situation, the customer has chosen Multiple Service Providers (MSPs) which operate as peers without ISCs designated as Masters or Remotes.

Customer groups (e.g. a business or a family) have a hierarchy of ISCs where each "child" ISC can inherit profile attributes and permissions from the "parent" ISC. Moreover, all operations data (e.g. provisioning, accounting, and billing, . . . ) is either done at the parent ISC level or for each child ISC, or both. The system described herein may also support Remote Users, that is, customers who travel to a domain other than their "home domain," and still have access to a significant part (if not all) of their subscribed (purchased) services.

Operations Aspects of Service Control, module 58 in FIG. 3, provides for communications between the ISC and various operational management functions. This includes interfaces to most, if not, all of the traditional Operations Process Areas (Capacity Provisioning, Service Delivery and Service Assurance) and Telecommunications Management Network (TMN) Functional Areas (Fault Management, Configuration Management, Account Management, Performance Management and Security Management—collectively known as the FCAPS functions).

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

Figure 8:
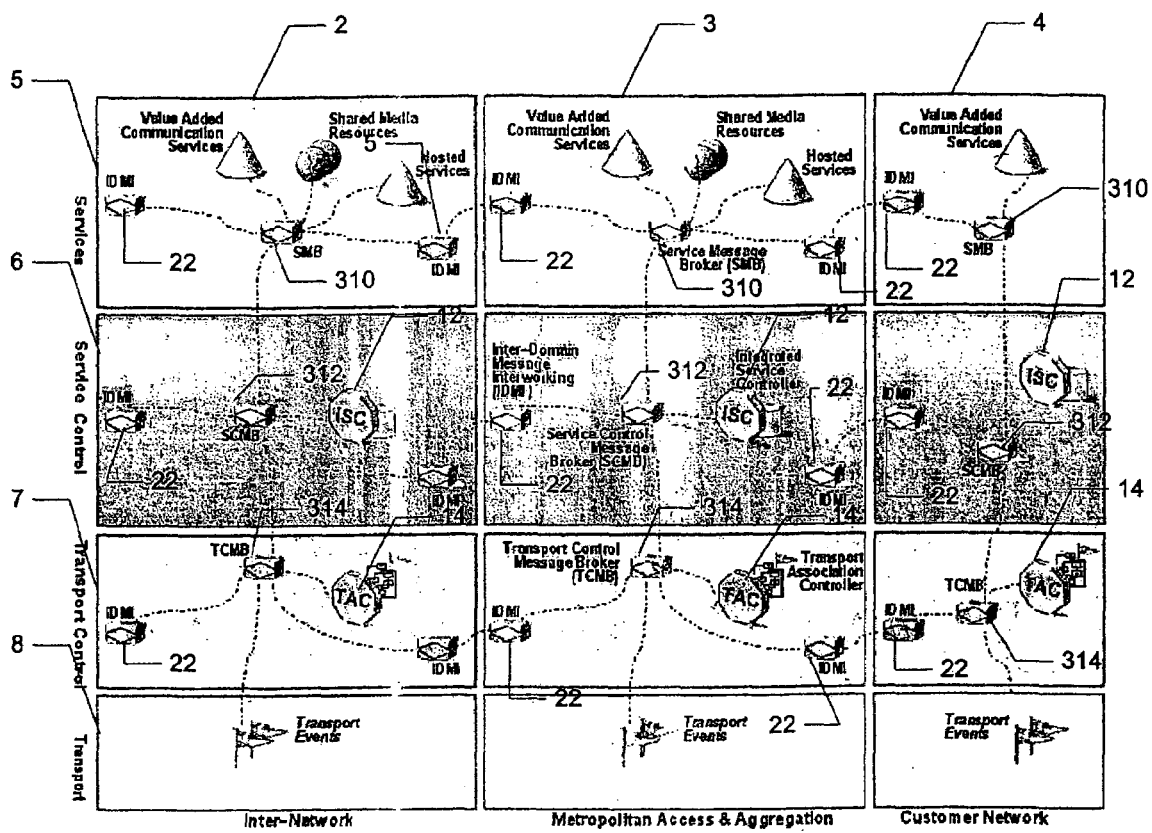
FIG. 8 discloses a system diagram for a service control functional architecture which employs distributed message brokers.

Disclosed in FIG. 8 is a diagram that illustrates the message broker capability for the communications systems 10 described above in FIG. 1. On a general level it is seen that each layer within a domain of the architecture includes at least one distributed message broker (DMB) e.g. 310, 312, and 314. In the configuration shown in FIG. 8, the primary purpose of the DMBs are to relay and screen messages based on prioritization schemes in support of message exchange between the different layers and domains. The relaying and screening of messages may be based on prioritization rules of a customer classification (relative ratings of customer attributes, e.g., Platinum, Gold, Silver, Bronze), associated service classification (relative ratings of service attributes), and system entity classification (relative ratings of system entity attributes) applied to a message classification of messages between system entities.

The DMB may be characterized as functionality that supports distribution and common messaging capabilities in a manner that is independent of underlying infrastructure (e.g., programming languages, platform OS, communication protocols) to the fullest extent possible. Examples of distribution capabilities include transparently invoking methods and delivery of event notifications to named objects, i.e., system entities, whereas examples of common capabilities include configurability of message-Quality of Service (QoS) as related to message distribution prioritization.

Within the system 10, DMBs play two primary roles. The first role is to relay and screen messages based on prioritization rules for intra-domain message exchange, both within a specific functional layer (e.g., service layer) and across vertically adjacent layers. Within a layer, the DMB is supporting distributed object communications. Across adjacent layers, the DMB is supporting message exchange with complementary messaging capabilities to fulfill event distribution amongst related system entity objects (e.g., between Service Directors and an ISC).

The second role the DMB plays is in inter-domain message exchange. Here, the DMB, referred to as an IDMI (Inter-Domain Message Inter-working) function, provides additional security, translation, object reachability, and non-repudiation capabilities that are essential for inter-provider object communications. It is assumed, from a functional perspective, that system entity objects will have high-level name and inter-object relationship knowledge that allows them to generically specify message destination.

DMB capabilities are fundamental messaging facilities required to support the distinct and systematic service framework that realizes higher degrees of vendor independence, service plug 'n' play, and service integration. While the generality of DMB allows reuse of generic capabilities, each of the functional layers in the architecture model also requires specific DMB capabilities as will be described below. To clarify the significance of a functional definition, the distributed messaging capabilities described herein will likely involve both client-server and peer-to-peer implementations. Thus, aspects of the defined capabilities may be realized in both the messaging end-points as well as messaging distribution points.

Referring again to FIG. 8, DMB functionality exists at each layer (5-7) of the communications system 10. The system diagram shows the logical relationship between DMBs and the system entities they support. As shown, DMBs e.g. 310, 312, and 314 generally provide message relay within a layer and across adjacent vertical layers to complementary DMBs. Message relay may further occur with Transport Association Controllers (TAC), Association State Managers (ASM), an Integrated Service Controller (ISC), a Service Director (logic) entity, and service management entities (fault, configuration, accounting, performance, and security systems). Message exchange across domain boundaries utilizes the Inter-Domain Message Inter-working (IDMI) DMB 22 which includes additional security and inter provider scope functionality.

Generally speaking, the DMBs enable a generic and reusable infrastructure that enables service objects to exchange messages and associated data. Message types can take the form of a request, information (e.g., responses to requests or notification "pushes"), or instruction (e.g., registration or commands). Key attributes are broken into two primary areas, distribution and common capabilities.

DMBs, at the simplest level, are functions that relay and screen messages (based on prioritization rules) between primary system entities. Message relay involves directing a message to the appropriate destination based on the high-level name provided in the message by the system entity object. Screening of message types—not message content—allows for the establishment of global policies that inhibit or flag (i.e., set an alarm) the relaying of particular messages. Screening may involve simple checks on the origination-destination name pair, or can be more complex and involve message security keys (e.g., digital certificates). Prioritization of message delivery can be static based on prioritization rules based on customer, service, and system entity classifications as well as operator policies or augmented by dynamic prioritization schemes.

DMBs instill the notion of message-QoS by allowing the specification of message delivery parameters that affect predictability and responsiveness. The message delivery parameters may affect the manner of delivery for messages of a particular classification of messages between identified origination-destination endpoints, such as various system entities. Message-QoS parameters may include timers, queuing priority order, levels of message delivery guarantees (control acknowledgement semantics), ordering of sequential messages, integrity of message delivery, and message duplication handling. In turn, the DMB realizes message-QoS via abstraction of resource control of physical elements (e.g., processing, communication, and memory).

The DMBs may be further configured to perform the message relay and screening prioritization of the messages of a message classification based on static message operation prioritization rules. The static message operation prioritization rules may comprise security policies, resource allocation arbitration, reactivity to communication network conditions to ensure performance levels, and relationship definitions of associated messaging endpoints. The DMB intelligently applies the static operation prioritization rules, along with the associated customer classification, service classification, and system entity classification prioritization against a message classification (e.g., message type and associated event information) through the application of the respective message-QoS for the message classification. This helps ensure that the respective system entity object messages receive the requisite message-QoS delivery guarantees.

The DMBs may further perform dynamic message delivery prioritization which augments the static message prioritization capabilities. Dynamic message prioritization is performed for message relay and screening of the messages of a message classification through communication with the system entities from which the one or more messages is generated or received. Dynamic prioritization allows system entity objects to delineate and negotiate message-QoS requirements relative to message delivery. Dynamic prioritization may only be applied to pre-specified classes of messages and can be overridden by static prioritization policies.

The DMB may still further support object discovery and object location transparency. Discovery allows a serving object to advertise capabilities and a client object to identify and obtain a reference to the server object methods. Transparency enables objects to easily communicate without requiring an object to know the addressable reference for every object in the relevant networks. Here, name resolution is used to resolve a name to an addressable reference. Naming conventions provide for interoperability and name-to-object interface resolution.

Message distribution modes for both sending and receiving messages by the DMB include unicast, multicast, and broadcast methods to support various messaging requirements. In support of sending multicast and broadcast messages, the DMB specifies the identity of the responding objects as well as ordering of the response messages based on prioritization. Some DMBs may likely be restricted to a unicast model to reduce complexity and enforce object functionality, e.g., a transport control DMB may be restricted to send TAC-ASM events toward a single integrated service control object.

Configurability of the DMB relative to back office Management functions allows a mechanism in which the DMB policies can be defined and modified. Examples of configurable policies include message classification defined on an extensible set of parameters and the mapping of message-QoS bounds to the message classifications based on prioritization rules. Examples of message classification parameters include message type (i.e., request, information, and instruction), associated event in message payload, or support of connection or connectionless oriented message transactions, etc.

Security aspects of the DMB relate to a system entity's right to transmit messages (identification and authentication) as well as authorization to access the target system entity. Also relevant is protection of the integrity and confidentiality of the message contents. It may be optional to apply security constraints on a DMB that is purely relaying messages within a trusted domain.

Each of the DMBs may be locatable in the various communications planes and domains shown in FIG. 8, and depending on that location, will include some additional capabilities. The Service Message Broker (SMB) 310 subsumes the general DMB capabilities described above, and adds some additional capabilities specific to the service layer 5. Specifically, the SMB will also need to enable message-QoS with respect to relaying messages through different Service Control Message Brokers (SCMB), the SMB 310 will also need to support message exchanges within the Service layer, and support of message exchange to specific operating planes.

SMBs 310 will likely need to exchange messages with multiple Service Control Message Brokers (SCMB) 312. For cases where a SMB has one-to-many links to SCMBs, the SMB will need to choose the appropriate SCMB when that relay decision may impact specified message-QoS.

For instance, if a message class requires a high level of message-QoS, then the SMB may need to choose the SCMB that can meet the specified message-QoS. While the SMB will be primarily concerned with exchanging messages between services and ISCs, there will also be the need for the SMB to provide other messaging relay capabilities. This implies that the SMB discriminates between messages associated with the service-to-service control layer interface versus service-to-other components in order to ensure appropriate message-QoS treatments are applied accordingly. Other component messages include intra-service object messages between partitioned service components (e.g., customer command and control messages to a network-based interactive service), or intra-service configuration messages (e.g., customer parameter adjustments). The SMB may also need to screen (allow or disallow) specific intra-service messages—based on type, classification, QoS, or any other parameter—to support appropriate message flow through the appropriate ISC in the Service Control layer.

Message exchange between the Service layer and operations functions may also utilize the SMB. These messages include intra-service configuration, service inventory, service management, and service provisioning interfaces. The SMB provides interfaces to these back-plane functions to support the necessary customer self-configuration and back-office capabilities.

The SCMB 312 subsumes the general DMB capabilities described above and adds some additional capabilities specific to the Service Control layer. The additional capabilities described here are the SCMBs ability to support message-QoS with respect to relaying messages through different SMBs and Transport Control Message Brokers (TCMB) 314, ISC-specific screening in support of inter-domain and distributed service control, and support of message exchange to specific operating planes.

By their definition, ISCs will need to exchange messages with distributed Service Directors and Transport Association Control objects. It may also be the case that multiple SMBs and TCMBs could be used for the identical message exchanged to/from an ISC. For cases where a SCMB has one-to-many links to SMBs or TCMBs, the SCMB will need to choose the appropriate SMB or TCMB to ensure message-QoS is maintained.

Remote users are defined as customers accessing and using home domain services from a remote domain. Consequently, if a remote or proxy ISC is utilized, then the SCMB will need to provide additional screening that is not done by the IDMI broker 7. Additional screening may involve the local ISC specifying under what conditions it will receive remote/proxy ISC messages.

Message exchange between the Service Control layer and operations functions may also utilize the SCMB. Messaging between the ISC and other planes includes customer access to modification of integrated profiles, ISC management, service control inventory, and service control provisioning interfaces.

The TCMB 314 subsumes the general DMB capabilities and adds some additional capabilities specific to the Transport Control layer 7. Specific capabilities of the TCMB include support of message-QoS with respect to relaying messages through different SCMBs, the ability to interwork prevalent signaling protocols, the ability to translate Transport layer events into TAC events, and the support of message exchange to specific operating planes. For cases where a TCMB has one-to-many links to SCMBs, the TCMB will need to choose the appropriate SCMB to maintain message-QoS.

Message exchange between the Transport Control layer and operations functions may also utilize the TCMB for TAC management, transport control inventory, and transport control provisioning interfaces.

The IDMI broker 7 subsumes the general DMB capabilities and adds some additional capabilities that span all four layers of the system 10. The IDMI broker enables message distribution across domain boundaries and possibly within a domain whenever messaging between providers is required. The IDMI broker will provide advertisement functions for system entities across provider domains via a schema that specifies object properties, such as ownership, licensing, methods, and parameters. The schema essentially provides partial views of objects from a remote domain perspective. The IDMI broker is responsible for authentication and authorization of objects involved in inter-provider domain exchanges as well as support of non-repudiation capabilities.

Scenarios may exist where messaging across domains requires additional message translation or tunneling. IDMI brokers may provide message translation or tunneling between remote system entity objects. Translation schemas would be defined in an extensible manner and applied to known translation scenarios. The message translation schemes employed by the IDMI broker are modular and configurable from a provisioning management system. In the event that translation capabilities are non-existent, then tunneling may be supported, provided that the objects in question agree to a common message protocol. Tunneling may be used for service object specific messaging requirements while translation may be used for inter-working of disparate message infrastructures.

To facilitate inter-domain message exchange, object reachability information will need to be shared in a secure and trusted manner. Policy enforcement can be used to provide rules on exchange of reachability information based on domain classification (authentication and authorization). In addition to proper security, the IDMI brokers may also provide either proxy or direct access to addressable objects. Direct access may only be used when appropriate security measures are in place.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A system for providing exchange of messages and associated data across a plurality of communication network system entities for a plurality of communications networks, comprising:
    at least one distributed message broker that operates in a services control layer and connectable to the plurality of communication network system entities of a plurality of communications networks, wherein the at least one message broker provides message processing between a plurality of system entities, wherein message processing includes at least one of: relaying and screening based on prioritization rules of at least one of customer classification, associated service classification, and system entity classification applied to a message classification of one or more messages communicated over the plurality of communications networks between the plurality of system entities; and
    an integrated service controller (ISC) connectable with the message broker;
    wherein the ISC classifies, registers, integrates, operates, and prioritizes a new telephony service and wherein the ISC includes processing modules that provide dynamic integration of multiple services, organization of customer preference information with regards to communication services, monitoring of transport, and intelligent prioritization and distribution of messages, wherein the message broker relays the one or more messages to an appropriate destination based on at least one high-level name incorporated into the one or more messages.

2. The system of claim 1 wherein the plurality of system entities includes at least one of: other of the at least one message brokers, the ISC, a service logic entity, and service management entities.

3. The system of claim 1 wherein the message classification comprises at least one of: message type (request, information, instruction), associated event in message payload, and level of support of connection or connectionless oriented message transactions between system entities.

4. The system of claim 1 wherein the message broker employs message delivery parameters which affect the manner of delivery for the one or more messages of a message classification between identified origination-destination endpoints.

5. The system of claim 4 wherein the message delivery parameters include at least one of: timers, queuing priority order, one or more levels of message delivery guarantees, ordering of sequential messages, integrity of message delivery, and message duplication handling.

6. The system of claim 5 wherein the message broker performs the message relay and screening prioritization of the one or more messages of a message classification based on static message operation prioritization rules.

7. The system of claim 6 wherein the static message operation prioritization rules comprise at least one of: security policies, resource allocation arbitration, reactivity to communication network conditions to ensure performance levels, and relationship definitions of associated messaging endpoints.

8. The system of claim 5 wherein the message broker performs dynamic prioritization for message relay and screening of the one or more messages of a message classification through communication with the system entities from which the one or more messages is generated or received.

9. The system of claim 1 wherein the message broker further distributes messages:
    including messages by which a serving system entity advertises capabilities and messages by which a client system entity identifies and obtains one or more references to methods associated with the serving system entity; and
    wherein the message broker further distributes messages between the serving system entity and the client system entity without an addressable reference.

10. The system of claim 1 wherein the at least one message broker further operates in a plurality of message distribution modes which include at least one of: unicast, multicast, and broadcast methods to support messaging requirements.

11. The system of claim 1 wherein the at least one message broker operates within the plurality of communications networks and relays or screens the one or more messages through the services control layer between at least one of: the plurality of system entities located in at least one service layer of at least one of the plurality of communications networks and the plurality of system entities located in at least one transport control layer of the at least one of the plurality of communications networks.

12. The system of claim 11 wherein the at least one message broker further exchanges the one or more messages with the integrated service controller in the service control layer of the at least one of the plurality of communications networks.

13. The system of claim 1 wherein the at least one message broker further provides message translation for the one or more messages communicated between the plurality of communications domains.

14. The system of claim 13 wherein the message translation includes message translation schemes which are modular and configurable from a provisioning management system.

15. The system of claim 1 wherein the at least one message broker further provides for authentication and authorization for the one or more messages exchanged between the plurality of communications domains.

16. The system of claim 1 wherein the at least one message broker further provides message tunneling for the one or more messages exchanged between the plurality of communications domains.

17. The system of claim 1 wherein the at least one message broker further provides non-repudiation of message relay and screening in order to provide proof of message exchange transaction.

18. A method for providing exchange of messages and associated data across a plurality of communication network system entities for a plurality of communications networks, comprising the steps of:
configuring at least one message broker in a service control layer to establish connections with a plurality of communication network system entities of at least one communications networks;
receiving and processing one or more messages from the system entities, wherein the processing includes at least one of: relaying and screening based on prioritization rules of at least one of customer classification, associated service classification, and system entity classification applied to a message classification of one or more messages communicated over the at least one communications network between the plurality of system entities;
configuring an integrated service controller (ISC) to classify, register, integrate, operate, and prioritize a new telephony service;
configuring processing modules of the ISC to provide dynamic integration of multiple services, organization of customer preference information with regards to communication services, monitoring of transport, and intelligent prioritization and distribution of messages, and;
providing non-repudiation of message relay and screening in order to provide proof of message exchange transaction.

19. The method of claim 18 wherein the plurality of system entities includes at least one of: other of the at least one message brokers, the ISC, a service logic entity, and service management entities.

20. The method of claim 18 wherein the message classification comprises at least one of: message type (request, information, instruction), associated event in message payload, and level of support of connection or connectionless oriented message transactions between system entities.

21. The method of claim 18 further comprising the step of relaying the one or more messages to an appropriate destination based on at least one high-level name incorporated into the one or more messages.

22. The method of claim 18 further comprising the step of employing message delivery parameters which affect the manner of delivery for the one or more messages of a message classification between identified origination-destination endpoints.

23. The method of claim 22 wherein the message delivery parameters include at least one of: timers, queuing priority order, one or more levels of message delivery guarantees, ordering of sequential messages, integrity of message delivery, and message duplication handling.

24. The method of claim 23 further comprising the step of performing the message relay and screening prioritization of the one or more messages of a message classification based on static message operation prioritization rules.

25. The method of claim 24 wherein the static message operation prioritization rules comprise at least one of: security policies, resource allocation arbitration, reactivity to communication network conditions to ensure performance levels, and relationship definitions of associated messaging endpoints.

26. The method of claim 23 further comprising the step of performing dynamic prioritization for message relay and screening of the one or more messages of a message classification through communication with the system entities from which the one or more messages is generated or received.

27. The method of claim 18 further comprising the steps of:
distributing messages which allow a serving system entity to advertise capabilities and a client system entity to identify and obtain one or more references to methods associated with the serving system entity; and
distributing messages which enable both the serving and client system entities to communicate without requiring knowledge of an addressable reference for every one of the system entities in the plurality of communications networks.

28. The method of claim 18 further comprising the step of operating in a plurality of message distribution modes which include at least one of: unicast, multicast, and broadcast methods to support messaging requirements.

29. The method of claim 18 wherein the at least one the message broker operates within the plurality of communications networks and relays or screens the one or more messages through the services control layer between at least one of: the plurality of system entities located in at least one service layer of at least one of the plurality of communications networks and the plurality of system entities located in at least one transport control layer of the at least one of the plurality of communications networks.

30. The method of claim 29 further comprising the step of exchanging the one or more messages with the integrated service controller in the service control layer of the at least one of the plurality of communications networks.

31. The method of claim 18 further comprising the step of providing message translation for the one or more messages communicated between the plurality of communications domains.

32. The method of claim 31 wherein the message translation comprises message translation schemes which are modular and configurable from a provisioning management system.

33. The method of claim 18 wherein further comprising the step of providing authentication and authorization for the one or more messages exchanged between the plurality of communications domains.

34. The method of claim 18 further comprising the step of providing message tunneling for the one or more messages exchanged between the plurality of communications domains.

35. A system for providing exchange of messages and associated data across a plurality of communication network system entities for a plurality of communications networks, comprising:
- at least one distributed message broker that operates in a services control layer and connectable to the plurality of communication network system entities of a plurality of communications networks, wherein the at least one message broker provides message processing between a plurality of system entities, wherein message processing includes at least one of: relaying and screening based on prioritization rules of at least one of customer classification, associated service classification, and system entity classification applied to a message classification of one or more messages communicated over the plurality of communications networks between the plurality of system entities; and
- an integrated service controller (ISC) connectable with the message broker;
- wherein the ISC classifies, registers, integrates, operates, and prioritizes a new telephony service and wherein the ISC includes processing modules that provide dynamic integration of multiple services, organization of customer preference information with regards to communication services, monitoring of transport, and intelligent prioritization and distribution of messages, wherein the at least one message broker further provides non-repudiation of message relay and screening in order to provide proof of message exchange transaction.

* * * * *

UNITED STATES PATENT AND TRADEMARK OFFICE
CERTIFICATE OF CORRECTION

PATENT NO. : 7,298,734 B2
APPLICATION NO. : 09/843082
DATED : November 20, 2007
INVENTOR(S) : Nabkel et al.

It is certified that error appears in the above-identified patent and that said Letters Patent is hereby corrected as shown below:

Title Page
Section (54), line 1, after the word "SYSTEM", insert --FOR--.

Column 1
Line 1, after the word "SYSTEM", insert --FOR--.

Column 11
Lines 18 and 19, delete the second occurrence of the word "are".

Column 15
Line 23, delete the word "Progess" and insert therefor --Progress--.

Signed and Sealed this

Eighteenth Day of March, 2008

JON W. DUDAS
*Director of the United States Patent and Trademark Office*